US008885067B2

(12) United States Patent
Shimura et al.

(10) Patent No.: US 8,885,067 B2
(45) Date of Patent: Nov. 11, 2014

(54) MULTOCULAR IMAGE PICKUP APPARATUS AND MULTOCULAR IMAGE PICKUP METHOD

(75) Inventors: Tomoya Shimura, Osaka (JP); Seiichi Tanaka, Osaka (JP)

(73) Assignee: Sharp Kabushiki Kaisha, Osaka (JP)

( * ) Notice: Subject to any disclaimer, the term of this patent is extended or adjusted under 35 U.S.C. 154(b) by 147 days.

(21) Appl. No.: 13/518,294

(22) PCT Filed: Dec. 22, 2010

(86) PCT No.: PCT/JP2010/073175
§ 371 (c)(1),
(2), (4) Date: Jun. 21, 2012

(87) PCT Pub. No.: WO2011/078244
PCT Pub. Date: Jun. 30, 2011

(65) Prior Publication Data
US 2012/0262607 A1    Oct. 18, 2012

(30) Foreign Application Priority Data
Dec. 24, 2009  (JP) ................. P2009-291624

(51) Int. Cl.
*H04N 5/262*    (2006.01)
*H04N 13/00*    (2006.01)
(Continued)

(52) U.S. Cl.
CPC ........... *H04N 5/232* (2013.01); *H04N 5/23232* (2013.01); *H04N 5/265* (2013.01);
(Continued)

(58) Field of Classification Search
CPC .. G06T 7/0075; G06T 1/0007; H04N 5/2258; H04N 5/23232; H04N 5/265; H04N 5/232; H04N 9/045; H04N 9/093; H04N 2209/048
USPC .................. 348/42–60, 239, 362; 382/154
See application file for complete search history.

(56) References Cited

U.S. PATENT DOCUMENTS 4,845,641 A * 7/1989 Ninomiya et al. ............ 345/632
(Continued)

FOREIGN PATENT DOCUMENTS

JP      6-141237 A    5/1994
(Continued)

OTHER PUBLICATIONS

International Search Report for PCT/JP2010/073175 mailed Apr. 5, 2011 with an English translation.

*Primary Examiner* — Timothy J Henn
*Assistant Examiner* — Pritham Prabhakher
(74) *Attorney, Agent, or Firm* — Birch, Stewart, Kolasch & Birch, LLP

(57) ABSTRACT

A multocular image pickup apparatus includes: a distance calculation unit that calculates information regarding the distance to a captured object from an output video of a first image pickup unit, which is to be the reference unit of a plurality of image pickup units that pick up images, and from an output video of an image pickup unit that is different from the first image pickup unit; a multocular video synthesizing unit that generates synthesized video from the output video of the plurality of image pickup units based on the distance information for regions where the distance information could be calculated; and a monocular video synthesizing unit that generates synthesized video from the output video of the first image pickup unit for regions where the distance information could not be calculated. The distance calculation unit calculates a first distance information that is the distance to the captured object from the output video of the first image pickup unit and the output video of a second image pickup unit that is different from the first image pickup unit, and in case that there is a region where the first distance information could not be calculated, for the region where the first distance information could not be calculated, the distance calculation unit recalculates information regarding the distance to the captured object from the output video of an image pickup unit that was not used for calculating the distance among the plurality of image pickup units, and from the output video of the first image pickup unit.

9 Claims, 18 Drawing Sheets

(51) Int. Cl.
*H04N 15/00* (2006.01)
*H04N 5/228* (2006.01)
*G06K 9/00* (2006.01)
*H04N 5/232* (2006.01)
*H04N 5/265* (2006.01)
*G06T 1/00* (2006.01)
*H04N 5/225* (2006.01)
*G06T 7/00* (2006.01)

(52) U.S. Cl.
CPC ............ *G06T 1/0007* (2013.01); *H04N 5/2258* (2013.01); *G06T 7/0075* (2013.01)
USPC ........... 348/239; 348/42; 348/222.1; 382/154

(56) References Cited

U.S. PATENT DOCUMENTS

| | | | |
|---|---|---|---|
| 5,602,584 A | 2/1997 | Mitsutake et al. | |
| 5,668,595 A * | 9/1997 | Katayama et al. | 348/218.1 |
| 7,718,940 B2 * | 5/2010 | Hirasawa et al. | 250/201.8 |
| 7,742,657 B2 * | 6/2010 | Kim et al. | 382/284 |
| 8,090,195 B2 * | 1/2012 | Oyama | 382/154 |
| 2007/0086645 A1 * | 4/2007 | Kim et al. | 382/154 |
| 2008/0143829 A1 | 6/2008 | Takeda | |
| 2011/0064299 A1 * | 3/2011 | Zhang et al. | 382/154 |
| 2011/0141306 A1 * | 6/2011 | Nakano et al. | 348/222.1 |
| 2011/0285910 A1 * | 11/2011 | Bamji et al. | 348/631 |

FOREIGN PATENT DOCUMENTS

| | | |
|---|---|---|
| JP | 2003-18617 A | 1/2003 |
| JP | 2004-96488 A | 3/2004 |
| JP | 2006-251613 A | 9/2006 |
| JP | 2007-520166 A | 7/2007 |
| JP | 2008-153997 A | 7/2008 |
| WO | WO 2005/072370 A2 | 8/2005 |

* cited by examiner

MULTOCULAR IMAGE PICKUP APPARATUS AND MULTOCULAR IMAGE PICKUP METHOD

TECHNICAL FIELD

The present invention relates to a multocular image pickup apparatus and a multocular image pickup method.

Priority is claimed based on the Japanese patent application 2009-291624, filed on Dec. 24, 2009, the content of which is incorporated herein by reference.

BACKGROUND ART

In recent years, digital still cameras and digital video cameras (hereinafter referred to as digital cameras) with high image quality have seen rapid growth in use. Digital cameras are also, in parallel with this, advancing in compactness and light weight, and compact digital cameras with high image quality have come to be incorporated into cellular telephone handsets and the like. Image pickup apparatuses, a typical form of which is a digital camera, include a lens optical system, which forms an image, and imaging elements, which photoelectric convert light formed as an image so as to output electrical signals. The imaging elements used are electronic devices such as CMOS (complementary metal oxide semiconductor) sensors or CCD (charge-coupled device) sensors or the like. These imaging elements photoelectric convert the distribution of light amount of the image that is formed on the image plane, so as to record it as the image plane image. In order to remove aberrations, lens optical systems are often made up of several aspherical lenses. In the case of incorporating a zoom function, a drive mechanism (actuator) is required to change the distance between a plurality of lens and the imaging elements.

In response to the demand for image pickup apparatuses with higher image quality and more sophisticated functionality, imaging elements have increased in numbers of pixels and higher definition, and image-forming optical systems are advancing in providing lower aberration and improved definition. This has been accompanied by the image pickup apparatus increasing in size, leading to the problem of difficulty in achieving compactness and thinness. With respect to such problem, proposals have been made to adopt a compound-eye structure in the lens optical system, and to use an image pickup apparatus constituted by a plurality of imaging elements and lens optical systems. For example, an imaging lens apparatus has been proposed having a constitution that includes a solid lens array disposed in a planar manner, a liquid-crystal array, and an imaging element (for example, refer to Patent Document 1). This imaging lens apparatus, as shown in FIG. 19, has a lens system that has a lens array 2001 and a variable focal length liquid-crystal lens array 2002 with the same number of lenses, an imaging element 2003, an arithmetic unit 2004, and a liquid-crystal drive unit 2005.

The imaging element 2003 images the optical image formed via this lens system.

The arithmetic unit 2004 image processes the plurality of images obtained from the imaging element 2003 so as to reconstitute the overall image.

The liquid-crystal drive unit 2005 detects focus information from the arithmetic unit 2004, so as to drive the liquid-crystal lens array 2002.

By adopting this constitution, a compact thin imaging lens apparatus with a shortened focal length can be implemented.

A thin-type color camera that has a sub-pixel resolution by combining four sub-cameras constituted by an imaging lens, a color filter, and a detector array has also been proposed (for example, refer to Patent Document 2). This thin-type color camera 200, as shown in FIG. 20A and FIG. 20B, is constituted by a lens 220, a color filter 250, and a detector array 240. The lens 220 has four lenses 220a to 220d. The color filter 250 has four color filters 250a to 250d. The color filter 250, as shown in FIG. 20B is constituted by the filter 250a, which passes red light (R), the filters 250b and 250c, which pass green light (G), and the filter 250d, which passes blue light (B). The detector array 240 images an image of red light, green light, and blue light. With this constitution, it is possible to obtain a full-color image by combining, with red and blue, a synthesized high-resolution image formed from two images of green light, with respect to which the human visual system has a high sensitivity.

In the case of synthesizing a high-resolution image from a plurality of images photographed with this plurality of cameras, it is necessary to synthesize by searching for corresponding points taken from the same region in each of the images. However, because of the occurrence of regions that can be photographed from one of the cameras but that cannot be photographed in what is called an occlusion, being hidden from the other camera behind an object, there are cases in which corresponding points cannot be obtained. There is the problem that, this occlusion region, because of erroneous searching for corresponding points, leads to a deterioration in image quality in the high-definition synthesized image. A known apparatus to solve this type of problem is a multocular imaging apparatus in which, in processing to synthesize a high-definition image from a template image and a reference image, in a region in which it is not possible to obtain pairs of corresponding points, the corresponding point of the template image is used as the synthesized image generated data, and the corresponding point in the reference image is not used as the synthesized image generated data (refer to, for example, Patent Document 3). This multocular imaging apparatus, in synthesizing a high-definition image from two images, of a left imaging system and a right imaging system, has an occlusion region determining unit that determines whether or not an occlusion region exists in which corresponding points cannot be obtained. Patent Document 3 discloses processing in which one of the images is not used as the synthesized image data in the occlusion region. By this constitution, it is said, it is possible to omit the processing procedure in a region in which an occlusion occurs, and also possible to suppress the deterioration of the image quality caused by error handling.

PRIOR ART DOCUMENT

Patent Document

Patent Document 1: Japanese Unexamined Patent Application Publication No. 2006-251613
Patent Document 2: Published Japanese Translation of PCT Application No. JP-T-2007-520166
Patent Document 3: Japanese Unexamined Patent Application Publication No. H6-141237

DISCLOSURE OF INVENTION

Problem to be Solved by the Invention

Although the multocular imaging apparatus of Patent Document 3 uses a multocular imaging apparatus having two cameras, left and right, it says that the number of cameras is not limited to two, and can be three or more. However, in the case of providing three or more cameras, because searching is performed for corresponding points between all camera pairs, there is a problem that the amount of processing increases commensurately with the multiple of the number of camera pairs. In Patent Document 3, template matching is described as a known method of searching for corresponding points, in which the similarity between blocks surrounding in their center one point in the template image with a block in the reference image is compared, the center pixel of the block having the highest similarity being taken as the corresponding point.

In this detection method, however, as the camera resolution increases, not only does the amount of processing become extremely large, but also synthesis of a high-definition image requires the detection of corresponding points with a precision that exceeds the camera resolution, that is, with sub-pixel precision. For this reason, the amount of the processing for detection of corresponding points becomes significantly greater than that for high-definition synthesis processing. With the constitution of Patent Document 3, if the number of cameras is increased for high definition, there is a commensurate increase in the amount of processing for corresponding point detection. In the case of imaging a movie, for example, it is necessary to detect corresponding points during the time period of one pixel clock, this leading to the problem of it being difficult during this time period to detect the corresponding points with high precision between all the cameras. One pixel clock, specifically, is 0.007 μs for the case of 1080/60P Hi-Vision movies.

The present invention was made in consideration of the above-noted situation, and has as an object to provide a multocular imaging apparatus and multocular imaging method capable of, in high-definition synthesis processing using three or more cameras, suppressing the deterioration of image quality in an occlusion region or in a corresponding point detection error region in which corresponding points cannot be found, without a great increase in the amount of processing.

A further object is to provide a multocular imaging apparatus and multocular imaging method capable of rendering a region, in which high definition was not possible because of failure to detect corresponding points in a manner approaching the visual psychological effect as when seen by the left and right human eyes, thereby improving the appearance of the overall high-definition synthesized image.

Means to Solve the Problem (1) A first aspect of the present invention is a multocular image pickup apparatus comprising: a plurality of image pickup units that pick up images; a distance calculation unit that calculates information regarding the distance to a captured object from an output video of a first image pickup unit, which is to be the reference unit of the image pickup units, and from an output video of at least one image pickup unit among the plurality of image pickup units that is different from the first image pickup unit; a multocular video synthesizing unit that generates synthesized video from the output video of the plurality of image pickup units based on the distance information for regions where the distance information could be calculated in the distance calculation unit; and a monocular video synthesizing unit that generates synthesized video from the output video of the first image pickup unit for regions where the distance information could not be calculated in the distance calculation unit; wherein the distance calculation unit calculates a first distance information that is the distance to the captured object from the output video of the first image pickup unit and the output video of a second image pickup unit that is different from the first image pickup unit, and in case that there is a region where the first distance information could not be calculated, for the region where the first distance information could not be calculated, the distance calculation unit recalculates, at least one time, information regarding the distance to the captured object from the output video of an image pickup unit that was not used for calculating the distance among the plurality of image pickup units, and from the output video of the first image pickup unit.

(2) In the first aspect of the present invention, the monocular video synthesizing unit may reduce, by a prescribed ratio, the luminance of the regions where the distance information could not be calculated in the distance calculation unit so as to generate the synthesized image.

(3) In the first aspect of the present invention, the monocular video synthesizing unit may lower a luminance value of the regions, where the distance information could not be calculated in the distance calculation unit, to lower than that of foreground regions adjacent thereto, so as to generate the synthesized image.

(4) In the first aspect of the present invention, the monocular video synthesizing unit may cause the luminance value of the regions where the distance information could not be calculated in the distance calculation unit are made to coincide with that of a background region adjacent thereto, so as to generate the synthesized image.

(5) In the first aspect of the present invention, the monocular video synthesizing unit may reduce, by the prescribed ratio, the color saturation of the regions where the distance information could not be calculated in the distance calculation unit, so as to generate the synthesized image.

(6) In the first aspect of the present invention, the monocular video synthesizing unit may lower color saturation of the regions where the distance information could not be calculated in the distance calculation unit to lower than that of foreground regions adjacent thereto, so as to generate the synthesized image.

(7) In the first aspect of the present invention, the monocular video synthesizing unit may cause the color saturation of the regions where the distance information could not be calculated in the distance calculation unit to conform with that of the background region adjacent thereto, so as to generate the synthesized image.

(8) In the first aspect of the present invention, the monocular video synthesizing unit may suppress a change of luminance of the regions where the distance information could not be calculated in the distance calculation unit so as to generate the synthesized image.

(9) A second aspect of the present invention is a multocular image pickup method comprising: calculating information regarding the distance to a captured object from an output video of a first image pickup unit, which is to be the reference unit of a plurality of image pickup units that pick up images, and from an output video of at least one image pickup unit among the plurality of image pickup units that is different from the first image pickup unit; generating a synthesized video from the output video of the plurality of image pickup units based on the distance information for regions where the distance information could be calculated; and generating a synthesized video from the output video of the first image pickup unit for regions where the distance information could not be calculated; wherein in case of calculating the distance information, calculating a first distance-information that is the distance to the captured object from the output video of the first image pickup unit and the output video of a second image pickup unit that is different from the first image pickup unit; and in case that there is a region where the first distance information could not be calculated, for the region where the first distance information could not be calculated, recalculating, at least one time, information regarding the distance to the captured object form the output video of an image pickup unit that was not used for calculating the distance among the plurality of image pickup units, and the output video of the first image pickup unit.

Effect of the Invention

According to the present invention, in high-definition synthesis processing using two or more cameras, it is possible to achieve suppression of the deterioration of image quality in an occlusion region or a corresponding point detection error region in which corresponding points cannot be found, without increasing the amount of processing. Additionally, it is possible to achieve the effect of rendering a region in which high definition was not possible because of failure to detect corresponding points in a manner that approaches the visual psychological effect as when seen by the left and right human eyes, thereby improving the appearance of the overall high-definition synthesized image.

BRIEF DESCRIPTION OF THE DRAWINGS

FIG. 13 is a schematic representation describing an occlusion region and describing the operation of a monocular video synthesis processing unit in the multocular imaging apparatus according to the first embodiment and.

BEST MODE FOR CARRYING OUT THE INVENTION

<First Embodiment>

Figure 1:
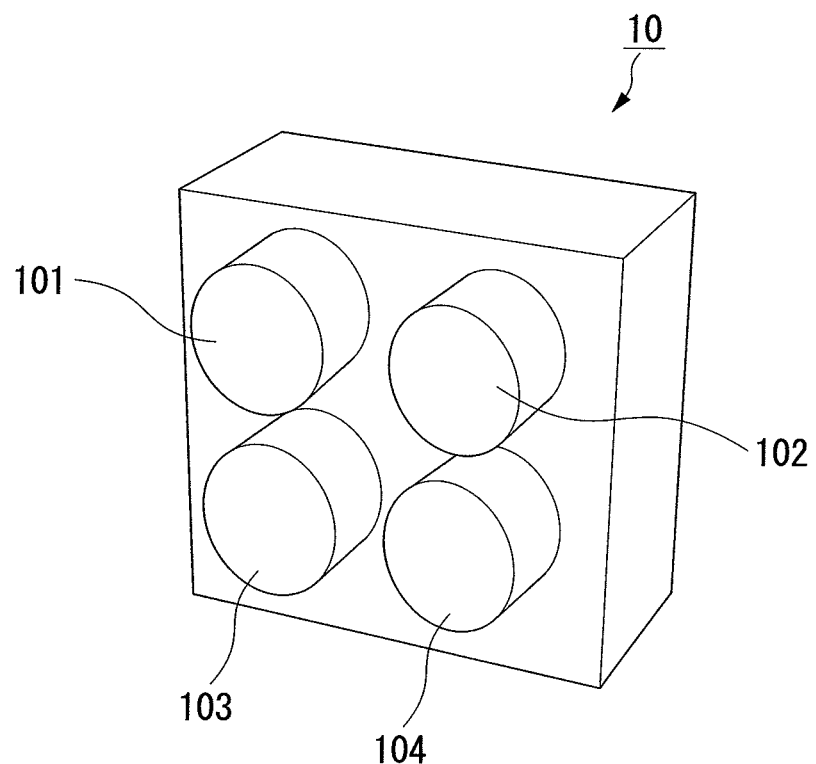
FIG. 1 is a conceptual drawing of a multocular imaging apparatus according to the first embodiment of the present invention.
Figure 2:
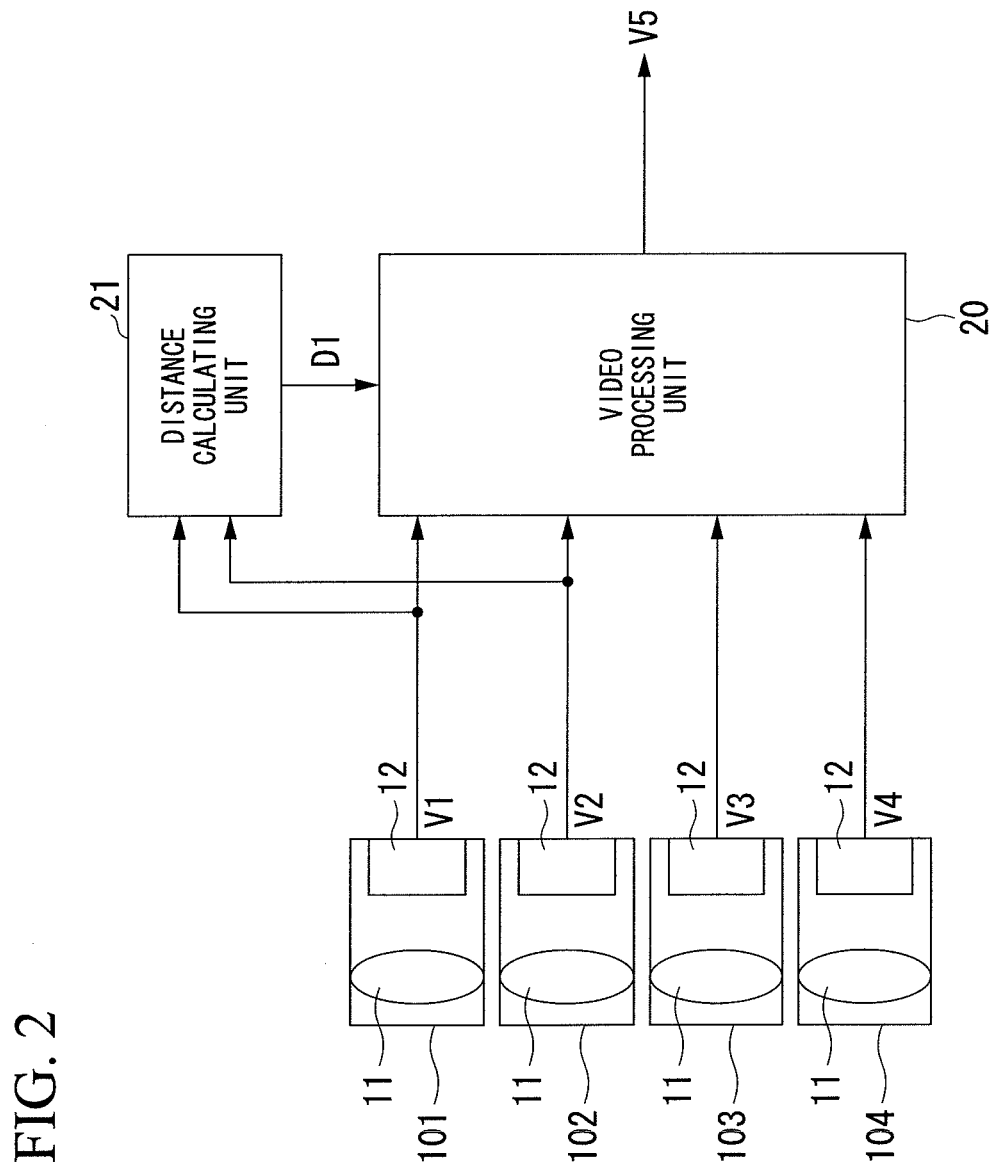
FIG. 2 is an overall block diagram of the multocular imaging apparatus according to the first embodiment.

The multocular imaging apparatus according to the first embodiment of the present invention will be described below, with references made to the drawings. FIG. 1 is a conceptual drawing of a multocular imaging apparatus according to the first embodiment of the present invention. FIG. 2 is a block diagram of the multocular imaging apparatus according to the same embodiment. As shown in FIG. 1, the multocular imaging apparatus 10 of the present embodiment has four sets of image pickup units 101, 102, 103, and 104. Each of the image pickup units 101, 102, 103, and 104 has an imaging lens 11 and an imaging element 12. The imaging lenses 11 form the light from the captured object onto the imaging elements 12, and the formed image is photoelectric converted by the imaging elements 12, for example, a CMOS imaging element or the like, and is output as video signals V1, V2, V3, and V4. By capturing by each of the four sets of image pickup units 101, 102, 103, and 104, the video signals V1, V2, V3, and V4 output from the corresponding set of image pickup units 101, 102, 103, and 104 are input to the video processing unit 20. Of the four sets of video signals, the video signals V1 and V2, output from the two image pickup units 101 and 102, are simultaneously input to the distance calculating unit 21 as well. The distance calculating unit 21 performs corresponding point searching from the two input video signals V1 and V2 and, from the result of the search, calculates and outputs to the video processing unit 20 the parallax data D1 between the two image pickup units. The video processing unit 20 performs synthesis processing of the input video signals V1, V2, V3, and V4 based on the parallax data D1 output from the distance calculating unit 21, and outputs a high-definition video V5.

Figure 3:
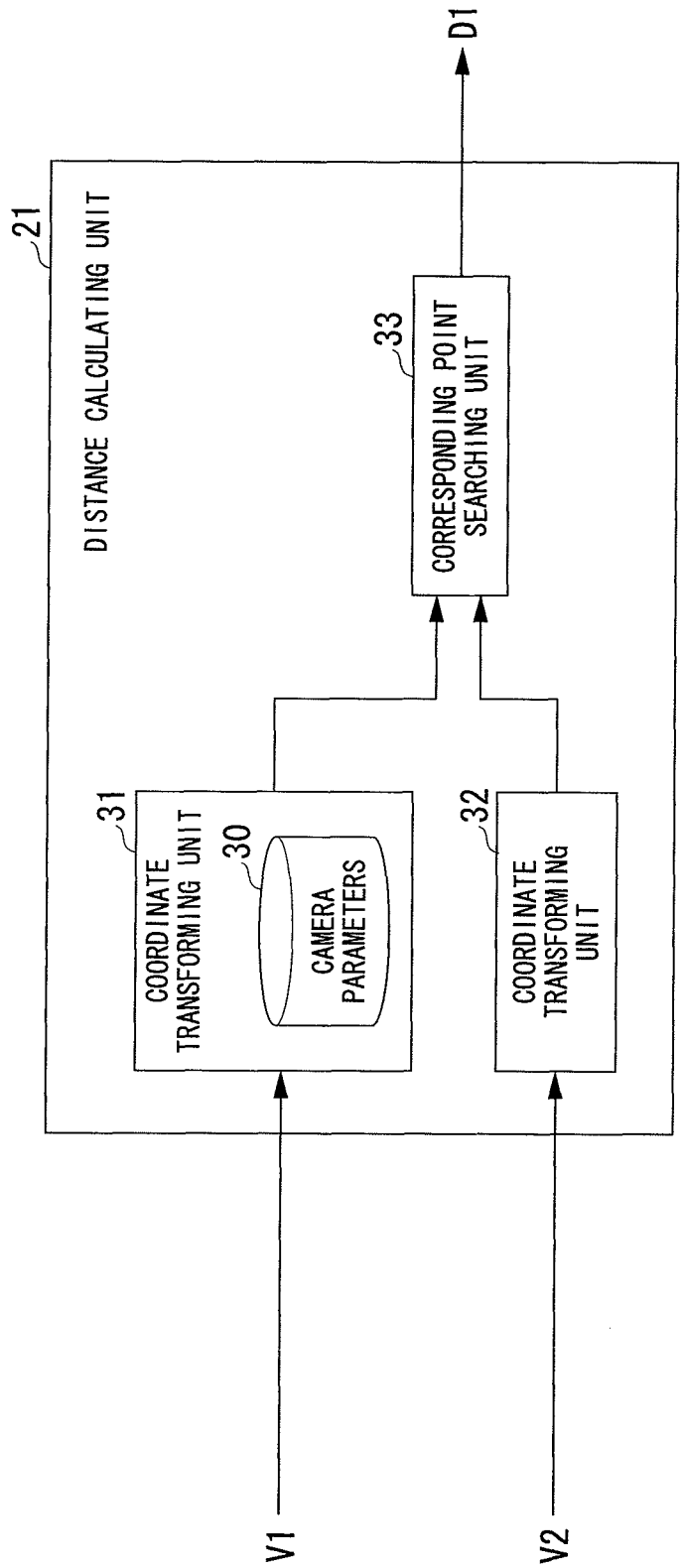
FIG. 3 is a block diagram of a distance calculating unit of the multocular imaging apparatus according to the first embodiment.

Next, referring to FIG. 3, the constitution of the distance calculating unit 21 shown in FIG. 2 will be described. FIG. 3 is a block diagram that shows the constitution of the distance calculating unit 21, which calculates the parallax data D1 from the image V1 (hereinafter referred to as the template image) captured by the image pickup unit 101 shown in FIG. 2 and the image V2 (hereinafter referred to as the reference image) captured by the image pickup unit 102. Two coordinate transforming units 31 and 32 perform a geometrical transformation (coordinate transformation) of both images so as to make the epipolar lines thereof parallel, for the purpose of placing the image planes of the template image and the reference image on one and the same image plane. Camera parameters 30 are internal parameters such as the focal length and lens distortion parameters that are peculiar to the image pickup unit 101, and external parameters that represent the positional relationship between the four image pickup units 101, 102, 103, and 104, these being held beforehand. Details of the camera parameters will be described later. In the same manner, a coordinate transforming unit 32 holds camera parameters peculiar to the image pickup unit 102 (not shown). A corresponding point searching unit 33 searches for corresponding points in the template image and the reference image, the epipolar lines of which have been made parallel, and determines and outputs the parallax data D1 of the reference image with respect to the template image.

Figure 4:
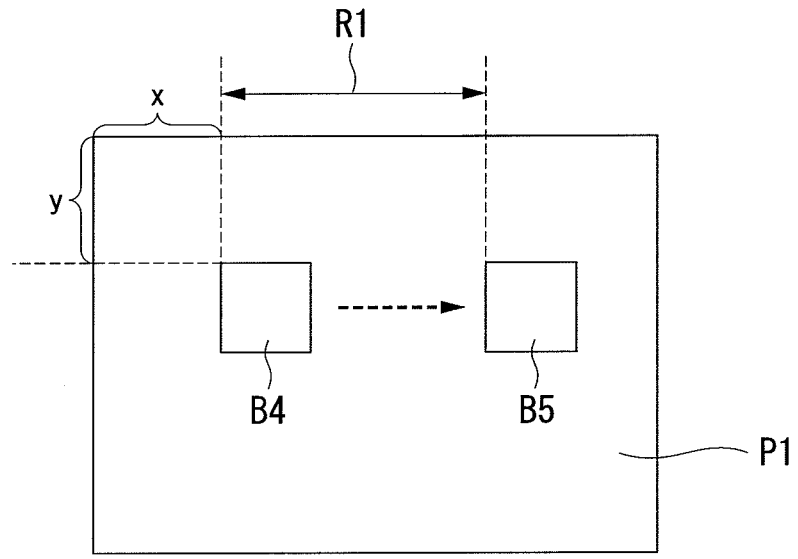
FIG. 4 is a schematic representation showing the corresponding point searching processing of the multocular imaging apparatus according to the first embodiment.
Figure 5:
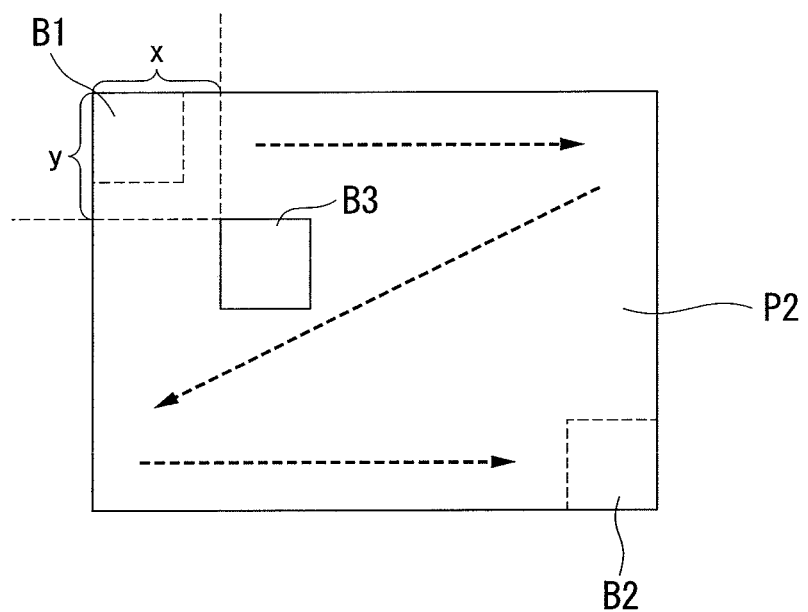
FIG. 5 is a schematic representation showing the corresponding point searching processing of the multocular imaging apparatus according to the first embodiment.

Next, referring to FIG. 4 to FIG. 7, the processing operation for searching for corresponding pixels will be described. FIG. 4 and FIG. 5 show the image planes after the epipolar lines of the reference image P1 and the template image P2 are made parallel. The determination of the pixel (corresponding point) in the reference image P1 that corresponds to a pixel in the template image P2 will be described for the method of moving the pixel of interest on the template image P2, using the drawing of the template image P2 shown in FIG. 5. A block that has the pixel of interest of the template image P2 at its center (hereinafter referred to as the block of interest) is moved from the upper-left of the image (searching start block B1) sequentially on a line toward the right side one pixel at a time and, in the case in which the moved block of interest reaches the right end of the line, the block of interest is moved sequentially on one line therebelow from the left side of the line toward the right side. This is repeated until the lower-right block (searching end block B2) of the template image is reached.

Next, the processing operation of searching for a block in the reference image P1 that is similar to one block of interest (template block of interest B3) in the template image P2 shown in FIG. 5 will be described, using the drawing of the reference image P1 shown in FIG. 4. From a block (reference block of interest B4) in the reference image P1 having the same coordinates as the coordinates (x, y) of the template block of interest B3 in the template image P2 shown in FIG. 5, the reference block of interest is sequentially moved toward the right side of the line one pixel at a time, this being repeated up until the searching end block B5 in the reference image shown in FIG. 4. The search range in this case (search range R1) is a value that is determined by the maximum parallax of the captured photographed object and, depending upon the set search range, the shortest distance to the object for which the parallax data D1 can be calculated. The above-noted search for the reference image block of interest B4 is performed for each template block of interest B3 in the template image P2 shown in FIG. 5.

Figure 6:
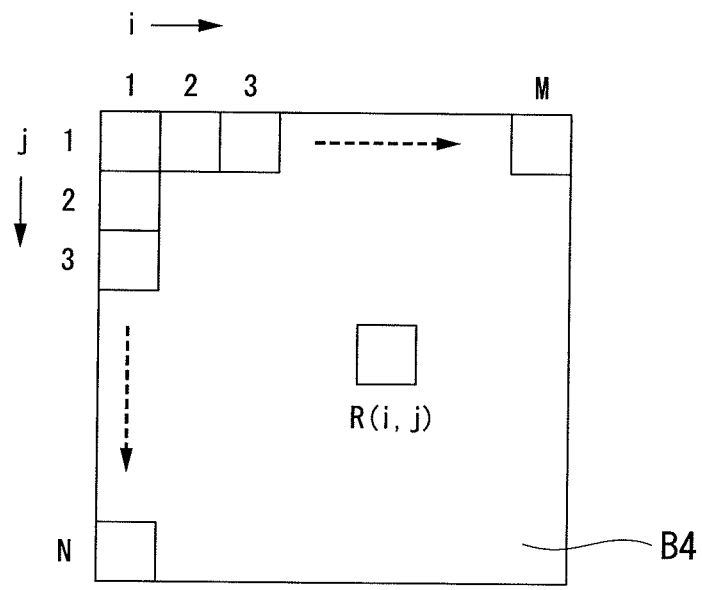
FIG. 6 is a schematic representation showing the corresponding point searching processing of the multocular imaging apparatus according to the first embodiment.
Figure 7:
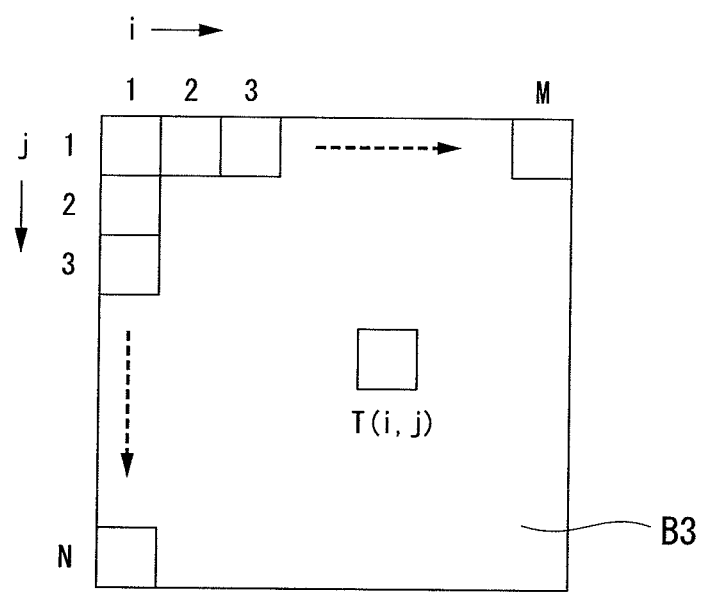
FIG. 7 is a schematic representation showing the corresponding point searching processing of the multocular imaging apparatus according to the first embodiment.
Figure 8:
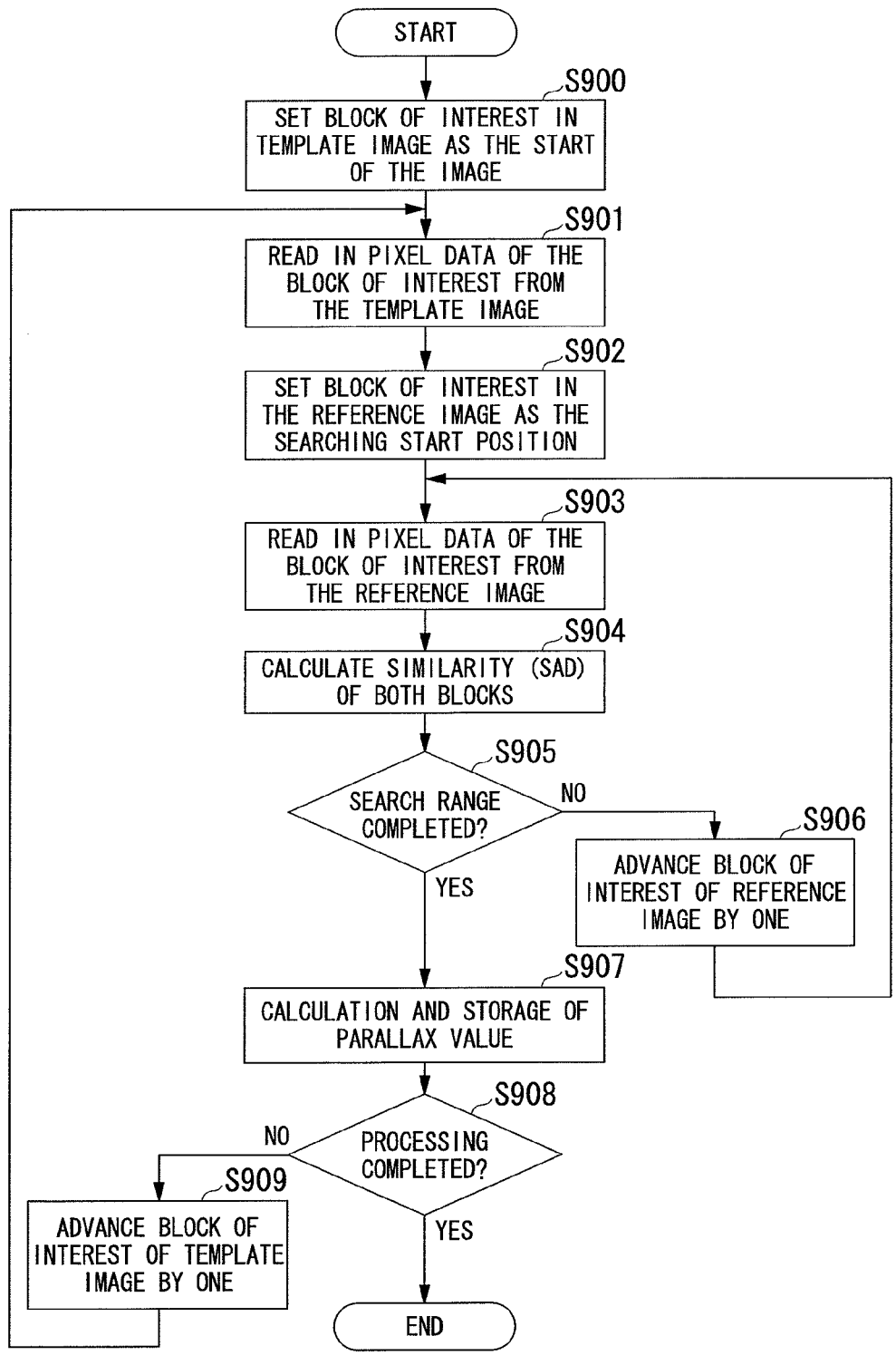
FIG. 8 is a flowchart of the corresponding point searching processing of the multocular imaging apparatus according to the first embodiment.

Next, the method of determining the reference image block of interest B4 similar to the template block of interest B3 will be described, with references made to FIG. 6 and FIG. 7. FIG. 7 shows the template block of interest B3, showing a block having a size of M horizontal pixels×N vertical pixels (where M and N are prescribed natural numbers), with the pixel of interest in the template image P2 at the center thereof. FIG. 6 shows the reference block of interest B4, showing a block having a size of M horizontal pixels×N vertical pixels, with the pixel of interest in the reference image P1 at the center thereof. To represent arbitrary pixels in the reference block of interest B4 shown in FIG. 6 and the template block of interest B3 shown in FIG. 7, with the horizontal direction taken as i and the vertical direction taken as j, the pixel values at the coordinates (i, j) are R(i, j) and T(i, j). The method used for determining the degree of similarity is the commonly used SAD (sum of absolute difference) method. In the SAD method, the value determined is, as shown in the degree of similarity determining equation of Equation (1), the sum (SSAD) of the absolute values of the differences between R(i, j) and T(i, j) determined for all the pixels in the block. The determination of a reference block of interest B4 that is similar to the template block of interest B3 is made by taking, of each reference block of interest B4 within the search range R1 in the reference image P1 shown in the above-noted FIG. 4, the reference block of interest B4 having the smallest value of SSAD as being similar to the template block of interest B3.

[Equation 1]

$$s_{SAD} = \sum_{j=1}^{N} \sum_{i=1}^{M} |R(i, j) - T(i, j)| \quad (1)$$

Although the foregoing description is for the case of performing the method of calculating the parallax data D1 for each processing unit, the method of processing in accordance with the sequence of the input pixels will be described with references made to processing flowing shown in FIG. 4 to FIG. 7 and FIG. 8. First, the template block of interest B3 is set as the start (searching start block B1) of the template image P2 (FIG. 5) (step S900). Then, all the pixel values of the template block of interest B3 are read out (step S901) from the template image P2 (FIG. 5). Next, the reference block of interest B4 is set (step S902) as the start of (upper-left of the reference image P1) of the reference image P1 (FIG. 4). Then, all the pixel values of the reference block of interest B4 are read out (step S903) from the reference image P1 (FIG. 4). The SSAD value of the pixel values of the read out template block of interest B3 and the reference block of interest B4 is calculated in accordance with Equation (1) and stored (step S904).

Next, a determination is made as to whether or not the search range R1 has been completed (step S905) and, if it is not yet completed, the reference block of interest B4 is moved in the line direction toward the right side by one pixel (step S906) and the processing of step S903 and step S904 is performed again. The processing of these steps S903 to S906 is repeated within the search range R1 and, after the completion of the calculation of all the SSAD values within the search range R1, the reference block of interest B3 having the smallest SSAD value is detected. The difference between the center coordinate of the template block of interest B3 (pixel of interest in the template image P2) and the center coordinate of the detected reference block of interest B4 (center coordinates in the reference image P1) becomes the parallax data D1 of the pixel of interest in the template image P2, which is stored (step S907).

Then, a determination is made as to whether processing has been completed (step S908) and, if it is not completed, the template block of interest B3 is moved in the line direction toward the right side by one pixel (step S909), and the processing of step S901 to step S907 is performed again. The processing of these steps S901 to S909 is repeated until the template block of interest B3 becomes the searching end block B2 of the template image P2 (FIG. 5), and the parallax data D1 for each pixel in the template image P2 is determined.

When, in step S907, the reference block of interest B4 having the minimum SSAD value is detected, the reference block of interest B4 having the minimum value is not necessarily the correct similar block. Erroneous detection may occur in cases in which there is no pattern (texture) in the template block of interest B3 or cases in which the searched region in the reference image P1 is an occlusion region. In order to reduce such erroneous detection of a similar block, there is a parallax calculation error detection method and an occlusion detection method, and one example of these methods is described in Patent Document 3. Because various methods for reducing the erroneous detection of a similar block are known, they will not be described in detail herein. With regard to a pixel of interest in the template image in the case in which a detection is made of a parallax calculation error or an occlusion in the searches at step S907, the parallax value of zero or a prescribed unique value is stored as the parallax data D1.

Although the above description is for a pixel in the reference image that is similar to a pixel of interest in the template image using the similarity evaluation function of SAD as an example of a processing method in the corresponding point searching unit 33 shown in FIG. 3, the method is not restricted to this method, and any method of searching for similar pixels in the template image and the reference images may be used to determine the parallax data.

Next, the constitution and the operation of the video processing unit 20 shown in FIG. 2 will be described, with reference made to FIG. 9. The video processing unit 20 has four compensation processing units 401-1 to 401-4, a monocular video synthesis processing unit 403, a multocular video synthesis processing unit 404, and a high-resolution synthesis processing unit 405. Each of the positioning compensation processing units 401-1 to 401-4 has a storage apparatus into which the camera parameters 402 are stored, although these are illustrated within a single positioning compensation processing unit 401-1. The video signal V1 (template image) of the image pickup unit 101 is applied to the positioning compensation processing unit 401-1 and, similarly, the video signals V2, V3, and V4 of the image pickup units 102, 103, and 104 are applied to the respective positioning compensation processing units 401-2, 401-3, and 401-4. The output of the positioning compensation processing unit 401-1 is applied to the monocular video synthesis processing unit 403. The outputs of the positioning compensation processing units 401-1 to 401-4 are applied to the multocular video synthesis processing unit 404. The output of the monocular video synthesis processing unit 403 and the output of the multocular video synthesis processing unit 404 are synthesized to the high-definition video V5 in the high-resolution synthesis processing unit 405 and output to outside the video processing unit 20.

The positioning compensation processing units 401-1 to 401-4, based on the parallax data D1 output from the distance calculating unit 21 (FIG. 3) and the camera parameters 402 that indicate the pointing and attitude of each of the image pickup units and the condition of lens distortion, perform position compensation so that the video of each of the image pickup units 101, 102, 103, and 104 captures the same position on the object to be captured. The monocular video synthesis processing unit 403 synthesizes a region, for example, in which at an occlusion the parallax data D1 could not be calculated at the distance calculating unit 21, that is, a region for which the parallax value is zero or a prescribed unique value, at the distance calculating unit 21 for the video signal captured by the image pickup unit 101, which is taken as the reference. The multocular video synthesis processing unit 404 performs high-definition synthesis of regions for which the parallax data D1 could be calculated at the distance calculating unit 21, using the video signals V1, V2, V3, and V4 of the four image pickup units 101, 102, 103, and 104.

Next, the operation of the positioning compensation processing units 401-1 to 401-4 will be described. The camera parameters 402 that indicate the pointing and attitude of each of the image pickup units 101 to 104 and the condition of lens distortion can be determined by calibration in which calculations are made from a number of captured images of a checkerboard pattern in which the pattern shape is known, while changing the attitude and angle to capture it several times. The camera parameters 402 are constituted by external parameters and internal parameters. The external parameters are constituted by the three axis vectors of yaw, pitch, and roll that indicate the attitude of camera, and three parallel translation vectors that indicate parallel movement components, for a total of six parameters. The internal parameters are constituted by five parameters that represent the image center position, the angle and aspect ratio of the coordinate that were assumed on the imaging element, and the focal length. At this point, the case of adjusting the video of the other image pickup units 102, 103, and 104 to the video of the image pickup unit 101, using the image pickup unit 101 as the reference, will be described. The shift amount calculated from the parallax data D1 up to the captured object and the spacing (camera base line length) between the reference image pickup unit 101 and the other image pickup units 102, 103, and 104 is subjected to geometric compensation processing, using parameters that take into consideration the amount of parallel translation, which are external parameters of the camera parameters. By doing this, the video of the four image pickup units 101, 102, 103, and 104 are position adjusted so as to capture the same point on the captured object at the same position (pixel).

Figure 10:
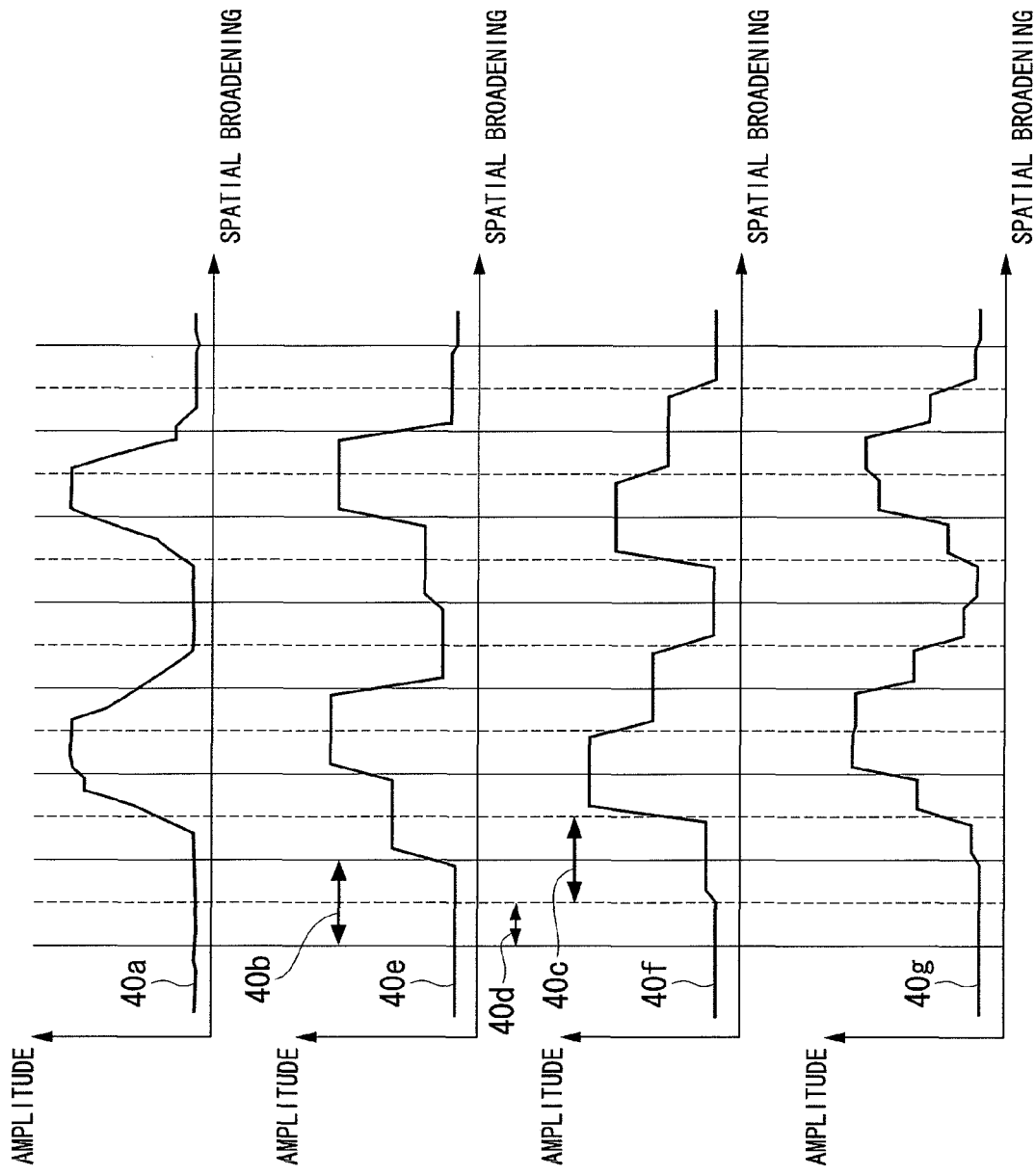
FIG. 10 is a schematic representation describing the operation of the multocular video synthesis processing unit of the multocular imaging apparatus according to the first embodiment.

Next, referring to FIG. 10, the operation of the multocular video synthesis processing unit 404 will be described. In FIG. 10, the horizontal axis indicates spatial broadening (size) and the vertical axis indicates the amplitude (brightness) of light. To simplify the description, the synthesis processing for two images captured by the two image pickup units 101 and 102 will be described. The reference symbol 40a indicates the light intensity distribution of the actual image. The reference symbols 40b and 40c in FIG. 10 are pixels of the respective image pickup units 101 and 102, the relative positioning relationship of which is offset by the amount indicated by the arrow represented by the reference symbol 40d. Because the image elements integrate the light intensity in pixel units, when the contour of the object indicated by the reference symbol 40a is captured by the image pickup unit 101, the video signal of the light intensity distribution indicated by the reference symbol 40e is obtained, and when it is captured by the image pickup unit 102, the video signal of the light intensity distribution indicated by the reference symbol 40f is obtained. By synthesizing these two images, it is possible to reconstitute a high-definition image indicated by the reference symbol 40g, which is close to the actual contour.

Figure 11:
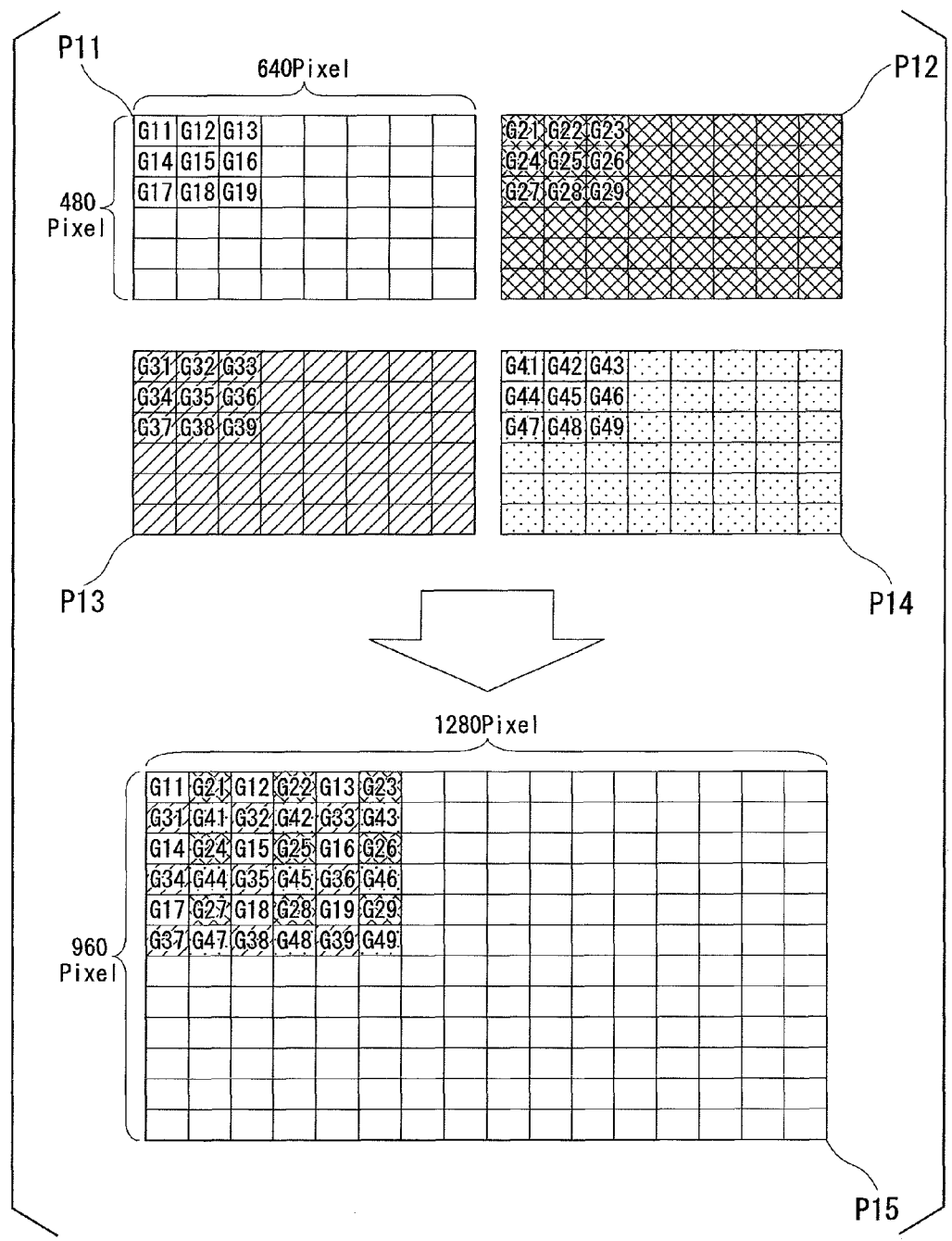
FIG. 11 is a schematic representation describing the operation of a quadrocular synthesis processing unit of the multocular imaging apparatus according to the first embodiment.

In FIG. 10, although the description was for the high-resolution synthesis processing using two images, FIG. 11 shows an example of high-resolution synthesizing using the images obtained from each of the four image pickup units 101, 102, 103, and 104. At this point, the case in which the resolution of the four image pickup units 101, 102, 103, and 104 is VGA (640×480 pixels) and high-resolution synthesis processing is done to a Quad-VGA (1280×960 pixels), which has four times of the number of pixels, will be described. As shown in FIG. 11, by synthesizing the four pixels that are adjacent to the Quad-VGA pixels (1280×960 pixels) by assigning pixels captured by different image pickup units, it is possible to obtain a high-resolution image.

As an example, let us say that the pixels on the uppermost line of the image P11 that is captured by the image pickup unit 101 are, in sequence, G11, G12, G13, and so on, from the left. In the same manner, let the pixels of the second line be in the sequence G14, G15, G16, and so on, from the left. And let the pixels on the third line be in the sequence G17, G18, G19, and so on, from the left.

And let us say that the pixels on the uppermost line of the image P12 that is captured by the image pickup unit 102 are, in sequence, G21, G22, G23, and so on, from the left. In the same manner, let the pixels of the second line be in the sequence G24, G25, G26, and so on, from the left. And let the pixels on the third line be in the sequence G27, G28, G29, and so on, from the left.

In the same manner, the reference symbols G31 to G39 and G41 to G49 as shown in FIG. 11 to the pixels of the images P13 and P14 captured by the image pickup units 103 and 104, respectively, are applied. The first line of the image P15 after high-resolution synthesis processing has the interleaving of the pixels of the first lines of the images P11 and P12 captured by the image pickup units 101 and 102, this being, from the left, G11, G21, G12, G22, G13, G23, and so on in that sequence. With regard to the second line, the pixels of the first lines of the images P13 and P14 captured by the image pickup units 103 and 104 are interleaved, this being, from the left, G32, G42, G33, G43, and so on, in that sequence. After the above, as shown in FIG. 11, the processing is repeated so that the image P15 after high-resolution synthesis has the same type of arrangement.

Figure 12:
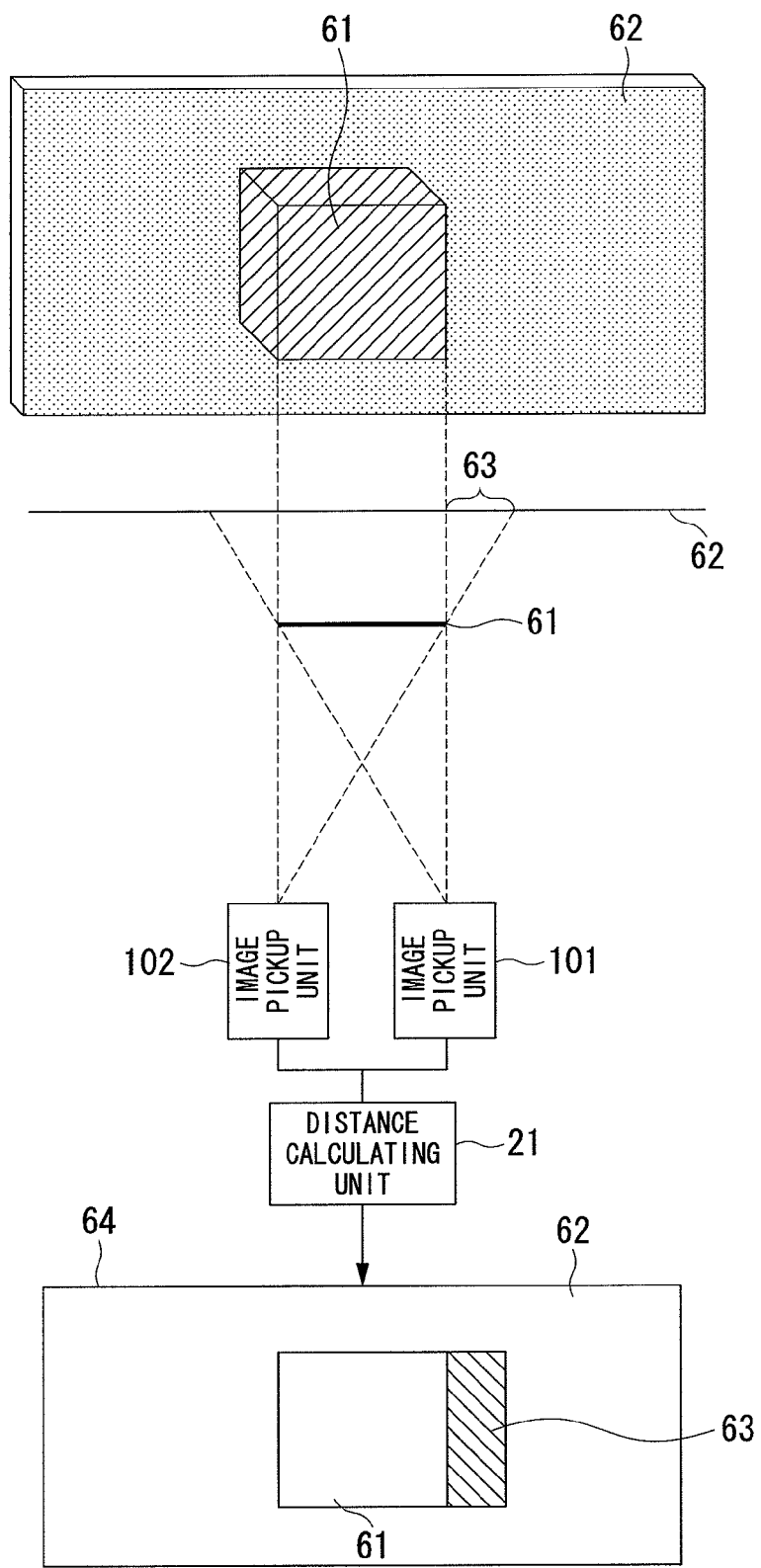
FIG. 12 is a schematic representation describing an occlusion region and describing the operation of a monocular video synthesis processing unit in the multocular imaging apparatus according to the first embodiment.
Figure 13:
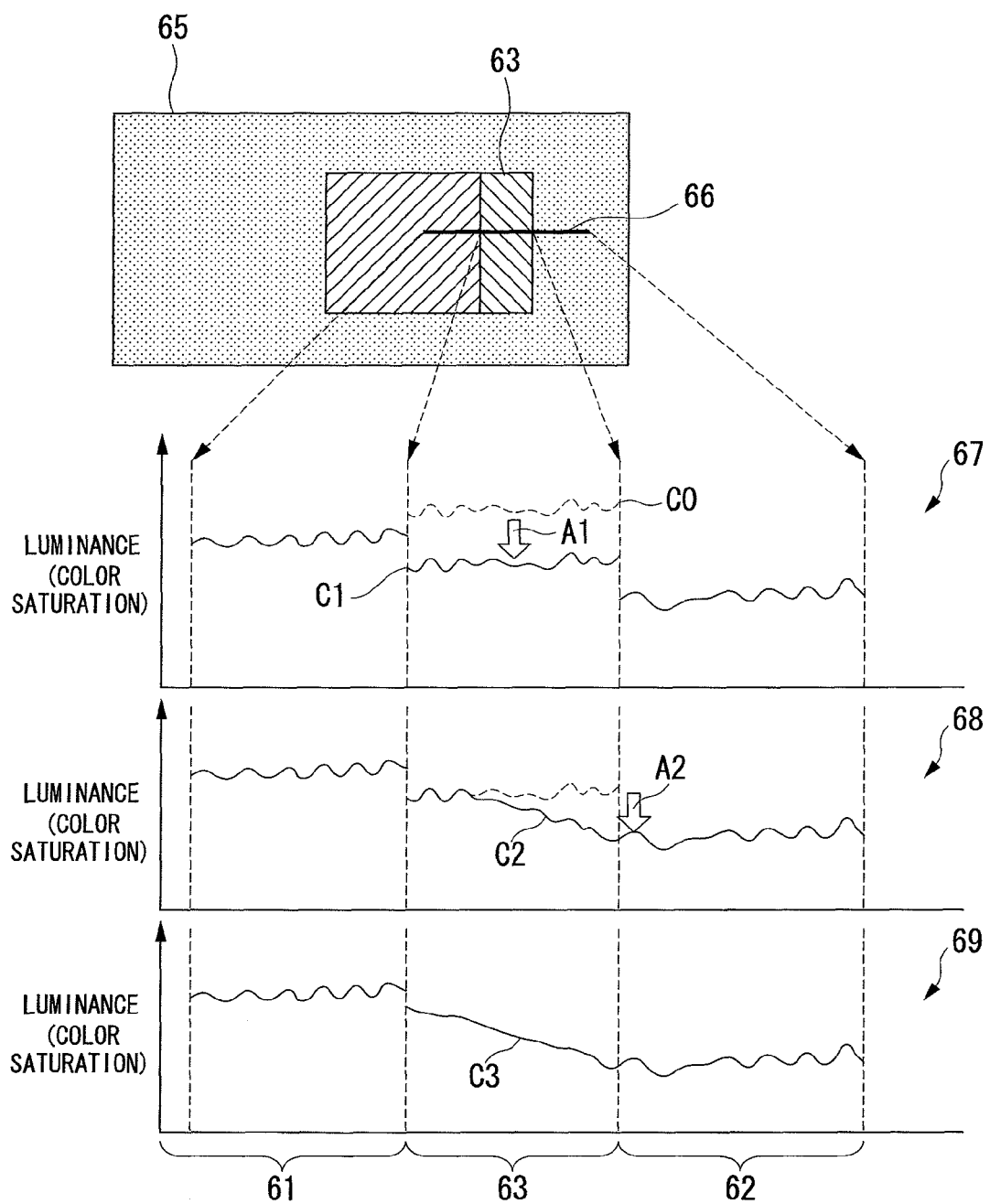

Next, referring to FIG. 12 and FIG. 13, an occlusion region and the operation of the monocular video synthesis processing unit 403, which performs video processing thereof, will be described. This description will be of the case in which a foreground region 61 (cube) disposed in front of a background region 62 is captured by each of the image pickup units 101 and 102. The top part of FIG. 13 shows, in simplified form, a high-definition image 65 after high-resolution synthesis processing. In the case of taking the image pickup unit 101 as the reference, in the parallax data 64 calculated by the distance calculating unit 21, an occlusion region 63 occurs that is seen by the image pickup unit 101 but is hidden from the image pickup unit 102 so as not to be seen. In FIG. 13, the occlusion region 63 is shown by hatching inclined downward toward the right.

Figure 9:
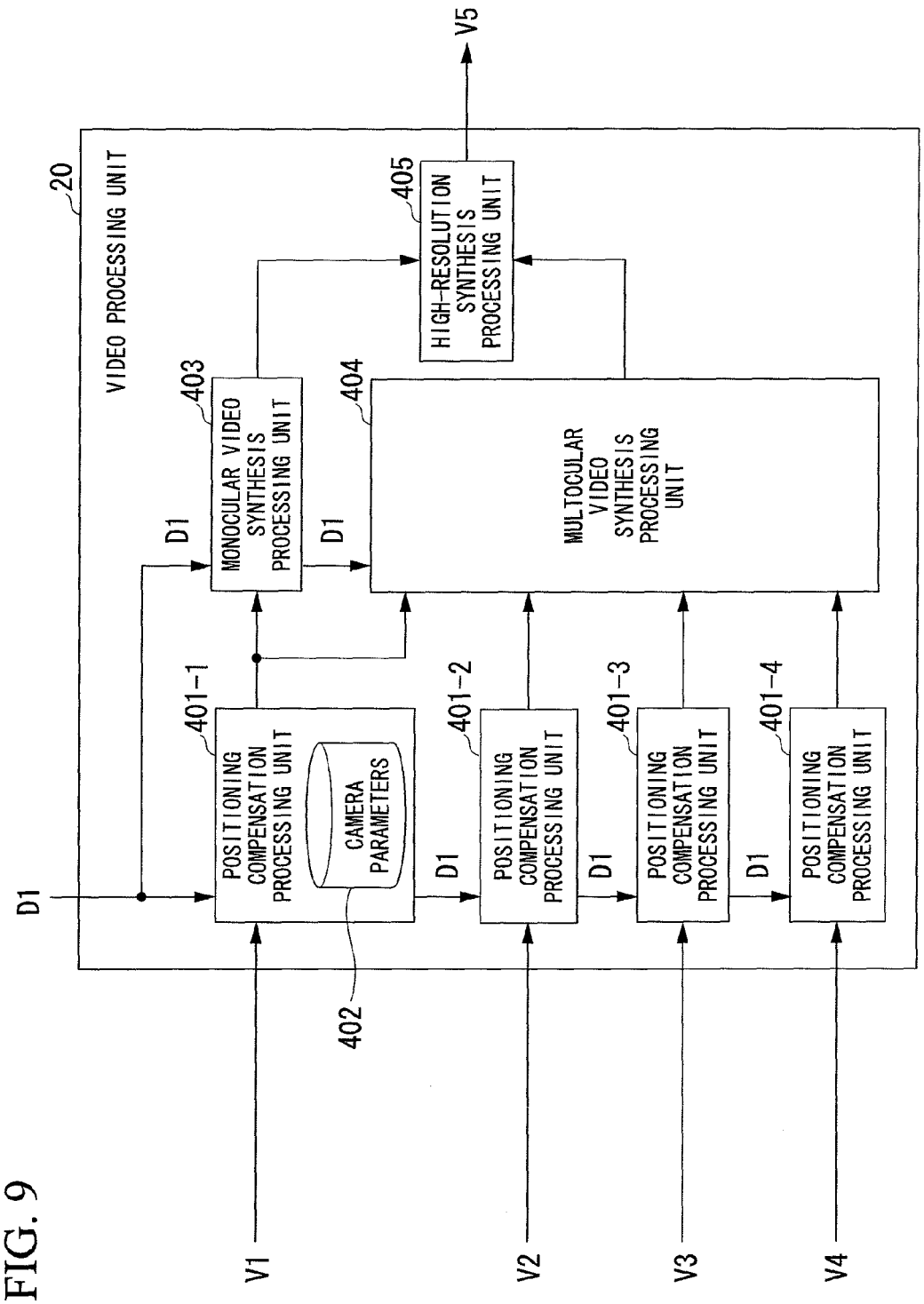
FIG. 9 is a block diagram of the video processing unit of the multocular imaging apparatus according to the first embodiment.

For the occlusion region 63, in which parallax data cannot be calculated, because video processing is performed at the monocular video synthesis processing unit 403 shown in FIG. 9, using the video of the image pickup unit 101 that is taken as the reference, and the distance can be calculated for the other regions, the high-resolution synthesis processing described by FIG. 10 and FIG. 11 is performed. The reference symbol 65 shown in FIG. 13 indicates the high-definition image generated by the video processing unit 20. In FIG. 13, the three graphs shown by the reference symbols 67, 68, and 69 indicate the change in intensity along the straight line 66 in the high-definition image 65. In the three graphs 67, 68, and 69, the vertical axis indicates the luminance, and the horizontal axis indicates position. From the left side along the horizontal axis, there are the foreground region 61, the occlusion region 63, and the background region 62. Because the parallax data 64 can be calculated for the background region 62 and the foreground region 61, the high-resolution synthesis processing described by FIG. 10 and FIG. 11 is performed using the four image pickup units 101, 102, 103, and 104.

In the occlusion region 63 the luminance curve C0 shown by a broken line in the graph 67, which uses the video of the image pickup unit 101 as is, is applied. In the case in which the luminance curve C0 is brighter than the luminance of the foreground region 61, the luminance value is reduced to correct it to the luminance curve shown by C1, as shown by the arrow A1 in graph 67 (luminance reduction compensation processing). By this video processing, the luminance in the occlusion region 63 can be synthesized darker than the foreground region 61. For this reason, it is possible to effectively present an appearance in a manner that approaches the human visual psychological effect of a dark appearance because of the occlusion, with the perception of brightness with depth. In order to adjust to the luminance at the rear side of the foreground region 61, as shown by the arrow A2 in the graph 68, compensation is done as shown by the luminance curve C2 (joining compensation processing). By this video processing, continuity is maintained between the brightnesses of the occlusion region 63 and the rear side of the region 62 that it is to be joined to, thereby enabling synthesis of an appearance that does not present an unnatural visual psychological effect. Additionally, as shown by the luminance curve C3 in the graph 69, the variation in the luminance of the occlusion region 63 is suppressed by smoothing filtering (smoothing compensation processing). By doing this, it is possible to effectively achieve a depth appearance of human visual psychological effect of blurred appearance because of the occlusion.

Although the above description was of monocular video synthesis processing that changes the luminance, processing in which luminance is replace by color saturation is also possible. That is, as shown in FIG. 13, by lowering the color saturation of the occlusion region 63 to lower than that of foreground region 61, it is possible to effectively achieve an appearance of the human visual psychological effect of colors becoming duller than the color of the foreground region due to occlusion with depth. Additionally, by adjusting the saturation of the occlusion region 63 to coincide with that of the rear side of the foreground region 61, continuity is maintained between the saturations of the occlusion region and the rear side of the region that is to be joined to, thereby enabling synthesis of an appearance that does not present an unnatural visual psychological effect.

Figure 14:
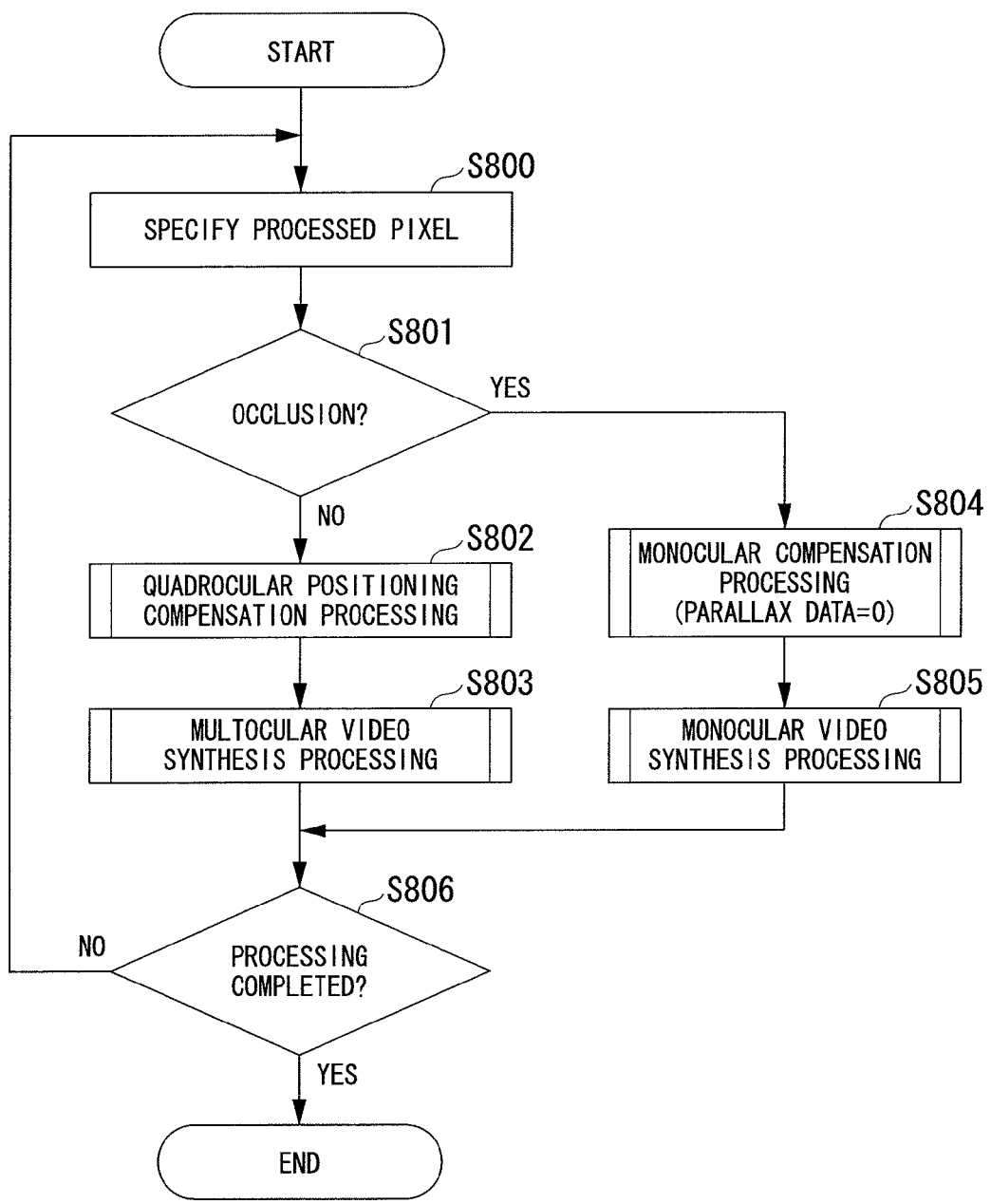
FIG. 14 is a flowchart describing the operation of the video processing unit of the multocular imaging apparatus according to the first embodiment.

Next, referring to FIG. 14, the operation of the video processing unit 20 shown in FIG. 2 will be described. First, after starting operation, the pixel that is to be subjected to video processing is specified (step S800). Next, a determination is made (step S801) of whether or not the specified pixel is an occlusion region 63. If it is not an occlusion region 63, that is, in the case in which the parallax data 64 could be calculated, positioning compensation processing by the camera parameters and the parallax data 64 is performed in all the video of the four image pickup units 101, 102, 103, and 104 (step S802). After that, multocular video synthesis processing is performed by the multocular video synthesis processing unit 404 (step S803). In the case, however, of the occlusion region 63, compensation processing is performed for the video of the image pickup unit 101, the parallax data 64 being zero (step S804). Then, monocular video synthesis processing (luminance reduction compensation processing, joining compensation processing, or smoothing compensation processing) is executed (step S805). The above-noted processing is repeated until the imaging processing is completed (step S806).

<Second Embodiment>

Figure 15:
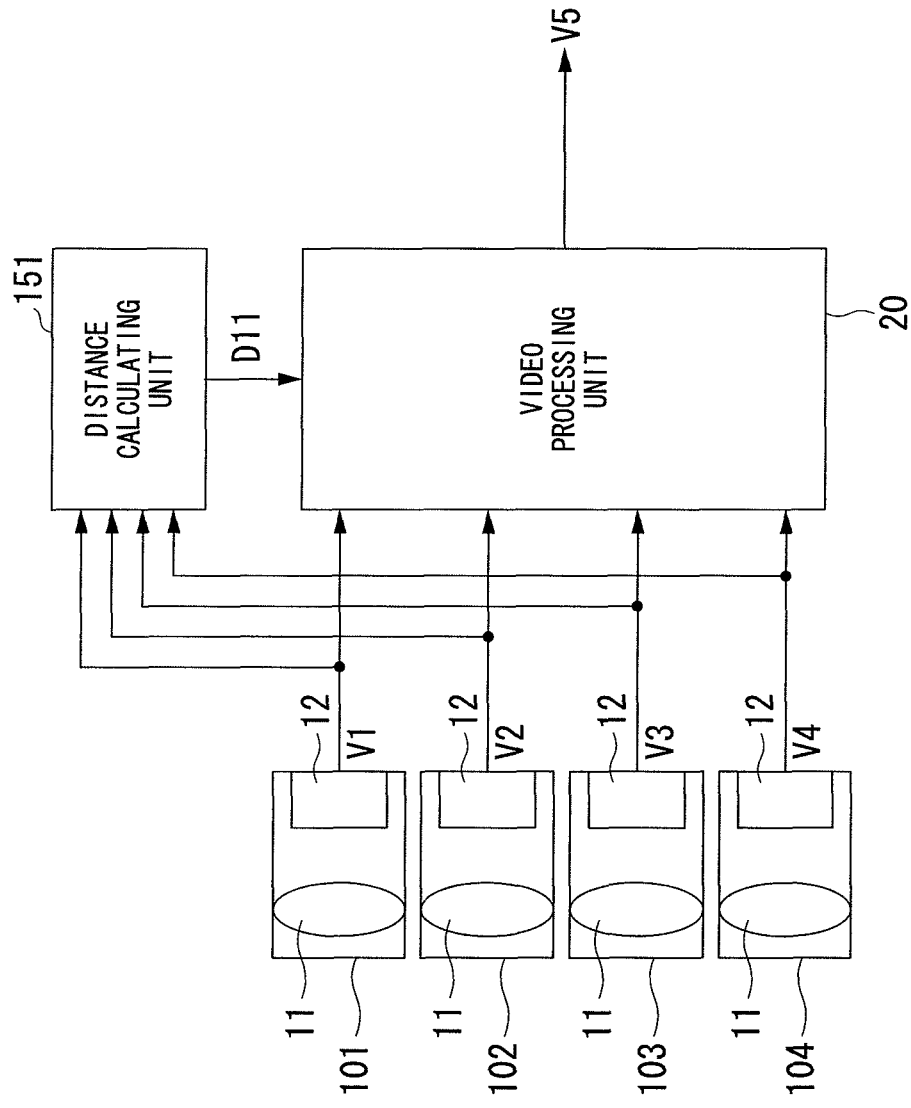
FIG. 15 is an overall block diagram of a multocular imaging apparatus according to a second embodiment.
Figure 16:
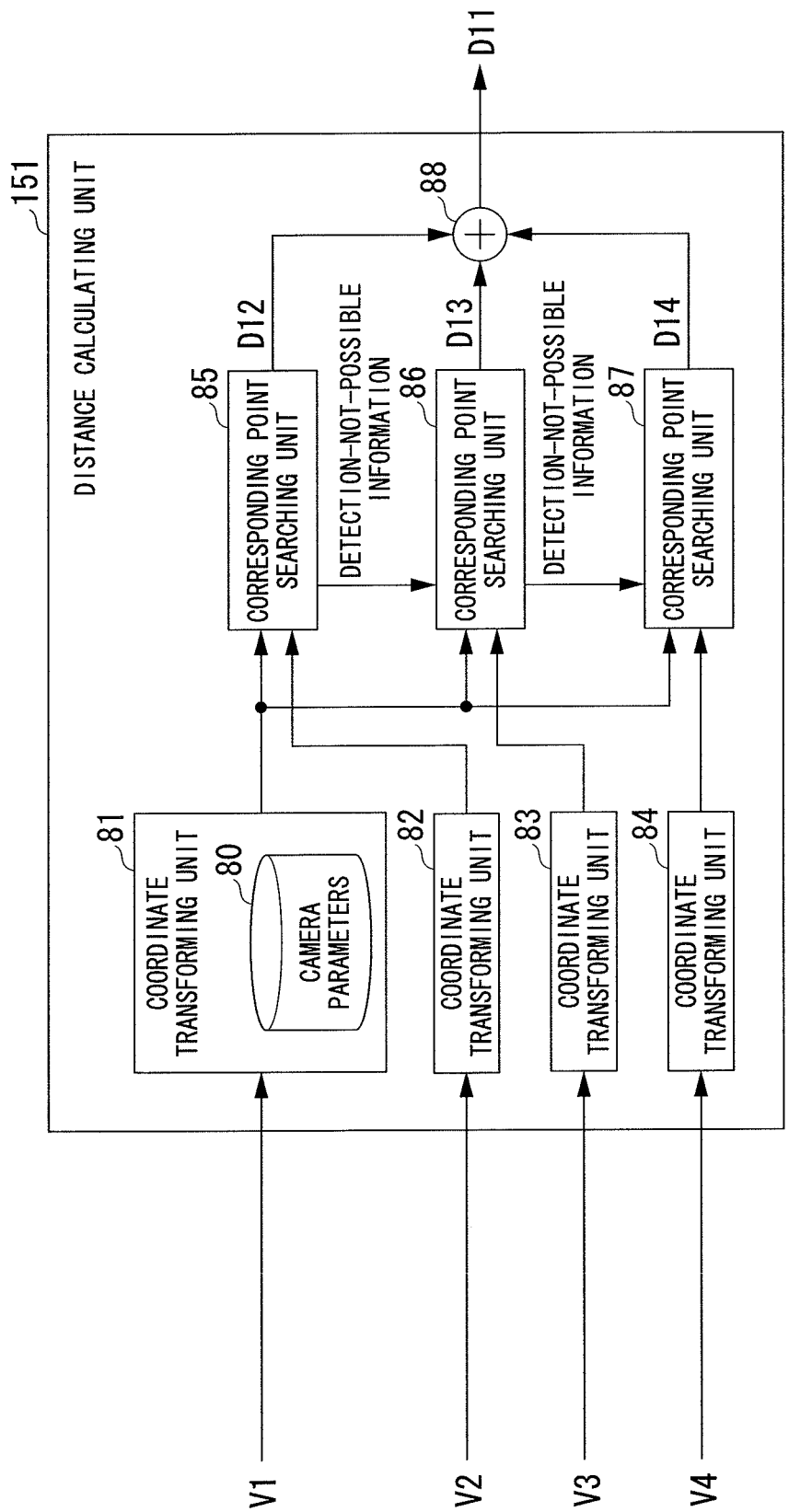
FIG. 16 is a block diagram of the distance calculating unit of the multocular imaging apparatus according to the second embodiment.

Next, referring to FIG. 15 and FIG. 16, the second embodiment of the present invention will be described. FIG. 15 is a block diagram showing the constitution of a multocular imaging apparatus according to the second embodiment. FIG. 16 is a block diagram showing the constitution of the distance calculating unit 151 shown in FIG. 15. In the multocular imaging apparatus 10 shown in FIG. 15, parts that are the same as in the multocular imaging apparatus 10 shown in FIG. 2 are assigned the same reference symbols and the descriptions thereof are omitted herein. The point of difference in the multocular imaging apparatus shown in FIG. 15 with respect to the multocular imaging apparatus 10 shown in FIG. 2 is that, rather than the distance calculating unit 21, it is provided with a distance calculating unit 151. The parallax data D11 that the distance calculating unit 151 outputs is sent to the video processing unit 20 shown in FIG. 15. Because, the video processing unit 20 shown in FIG. 15, with the exception of changing the parallax data D1 of the video processing unit 20 shown in FIG. 9 to read D11, is the same as the video processing unit 20 shown in FIG. 9, the description thereof is omitted. The distance calculating unit 151 shown in FIG. 15 inputs the video signals V1, V2, V3, and V4 from the four image pickup units 101, 102, 103, and 104, respectively, and calculates the distance (parallax).

Next, referring to FIG. 16, the constitution of the distance calculating unit 151 shown in FIG. 15 will be described. The distance calculating unit 151 inputs the video signals V1, V2, V3, and V4 captured from the four image pickup units 101, 102, 103, and 104, respectively. The distance calculating unit 151 shown in FIG. 16 calculates the parallax data D11 from the image captured by the image pickup unit 101 (hereinafter referred to as the template image P21), the image captured by the image pickup unit 102 (hereinafter referred to as the first reference image P11), the image captured by the image pickup unit 103 (hereinafter referred to as the second reference image P12), and the image captured by the image pickup unit 104 (hereinafter referred to as the third reference image P13), shown in FIG. 15. The coordinate transforming units 81 to 84, perform a geometrical transformation (coordinate transformation) of each image for the purpose of placing the image planes of the template image P21 and each of the reference images P11 to P13 on the same plane. Because the coordinate transformation processing is the same as in the coordinate transforming units 31 and 32 shown in FIG. 3, its detailed described is omitted herein.

The corresponding point searching units 85 to 87, with regard to the template image P21 and each of the reference images P11 to P13, which have been geometrically transformed so that the image planes thereof are on the same plane, searches for corresponding points between the transformed template image P21 and each of the reference images P11 to P13, and determines the parallax data D11 of each of the reference images P11 to P13 with respect to the template image P21. The corresponding point searching unit 85 calculates the parallax data D12 between the template image P21 and the first reference image P11, in the same manner as in the corresponding point searching unit 33 shown in FIG. 3. When this is done, with regard to a pixel of interest at which a parallax calculation error or an occlusion is detected at step S907 shown in FIG. 8, a value of zero or a unique prescribed value of the parallax value is stored as the parallax data D12. The corresponding point searching unit 85 also outputs detection-not-possible information that indicates a parallax calculation error or an occlusion pixel of interest to the corresponding point searching unit 86. This detection-not-possible information can be, for example, setting the coordinate information of the coordinates of interest to −1, which indicates that detection is not possible.

The coordinating point searching unit 86, similar to the corresponding point searching unit 85, calculates the parallax data D13 between the geometrically transformed template image P21 and the second reference image P12. However, the corresponding point searching unit 85 searches for a corresponding point between the geometrically transformed template image P21 and the overall second reference image P12. In contrast, the corresponding point searching unit 86, in accordance with the detection-not-possible information sent from the corresponding point searching unit 85, with regard to pixels of interest in the template image P21 for which a parallax error or an occlusion is detected, searches for the corresponding pixel from the second reference image P12 and calculates the parallax data D13. When this is done, similar to the corresponding point searching unit 85, if a parallax calculation error or occlusion is detected, detection-not-possible information is sent to the corresponding point searching unit 87.

The corresponding point searching unit 87, similar to the corresponding point searching unit 86, in accordance with detection-not-possible information sent from the corresponding point searching unit 86, with regard to the geometrically transformed template image P21 and the third reference image P13, for a pixel of interest of the template image P21 for which a parallax calculation error or occlusion is detected, searches for a corresponding pixel from the third reference image P13, and calculates the parallax data D14.

Next, the processing for combining the parallax data D12, D13, and D14 calculated by the corresponding point searching units 85, 86, and 87, respectively, will be described. The parallax data D12 calculated by the corresponding point searching unit 85, the parallax data D13 calculated by the corresponding point searching unit 86 regarding the region (coordinates) in the template image P21 at which a parallax calculation error or occlusion was detected and could not be calculated by the corresponding point searching unit 85, and the parallax data D14 calculated by the corresponding point searching unit 87 regarding the region (coordinates) in the template image P21 at which a parallax calculation error or occlusion was detected and could not be calculated by the corresponding point searching unit 86 are combined by the combining unit 88, which calculates the parallax data D11 with respect the template image P21.

Figure 17:
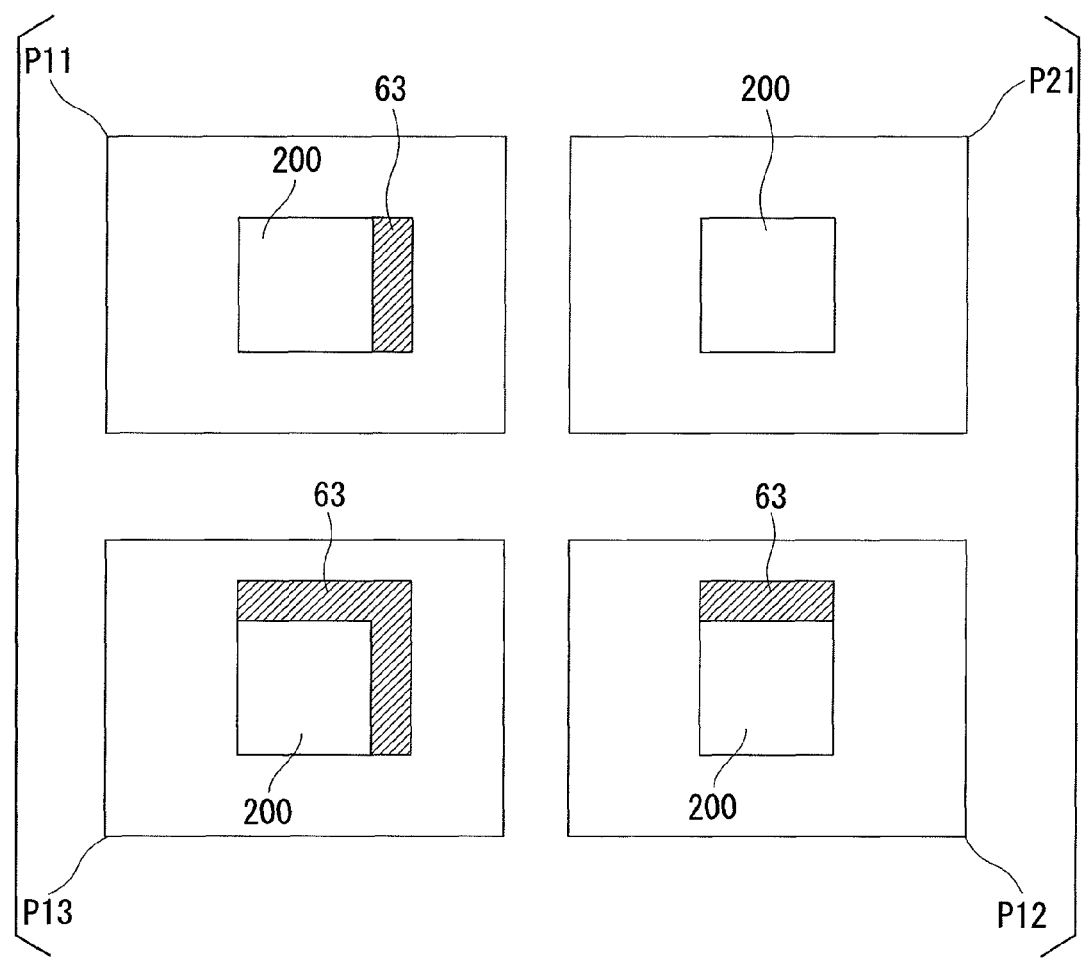
FIG. 17 is a schematic representation showing the corresponding point searching method of the multocular imaging apparatus according to the second embodiment.

The method of calculating the parallax data up to the foregoing will now be described by the example of an occlusion region. FIG. 17 shows the template image P21 and occlusion regions 63 each of the reference images P211, P12, and P13. In the case of performing corresponding point searching between the template image P21 and the first reference image P11, as shown in the drawing (upper-left of FIG. 17) showing the first reference image P11, there is the parallax data D12 for which the occlusion region 63 occurs at the right side of the captured object 200. Also, in the case of performing corresponding point searching between the template image P21 and the second reference image P12, as shown in the drawing (lower-right of FIG. 17) that indicates the second reference image P12, there is a parallax data D13 for which the occlusion region 63 occurs at the upper side of the captured object 200. Further, in the case of performing corresponding point searching between the template image P21 and the third reference image P13, as shown in the drawing (lower-left of FIG. 17) that indicates the third reference image P13, there is a parallax data D14 for which the occlusion region 63 occurs at the right side and the upper side of the captured object 200. Therefore, with the constitution of the first embodiment (constitution shown in FIG. 3), the occlusion region 63 must occur at the right side of the captured object 200 as shown in the first reference image P11. However, with the constitution of the second embodiment (constitution shown in FIG. 16), it is possible to eliminate the occlusion region 63 by using the second reference image P12 or the third reference image P13.

Figure 18:
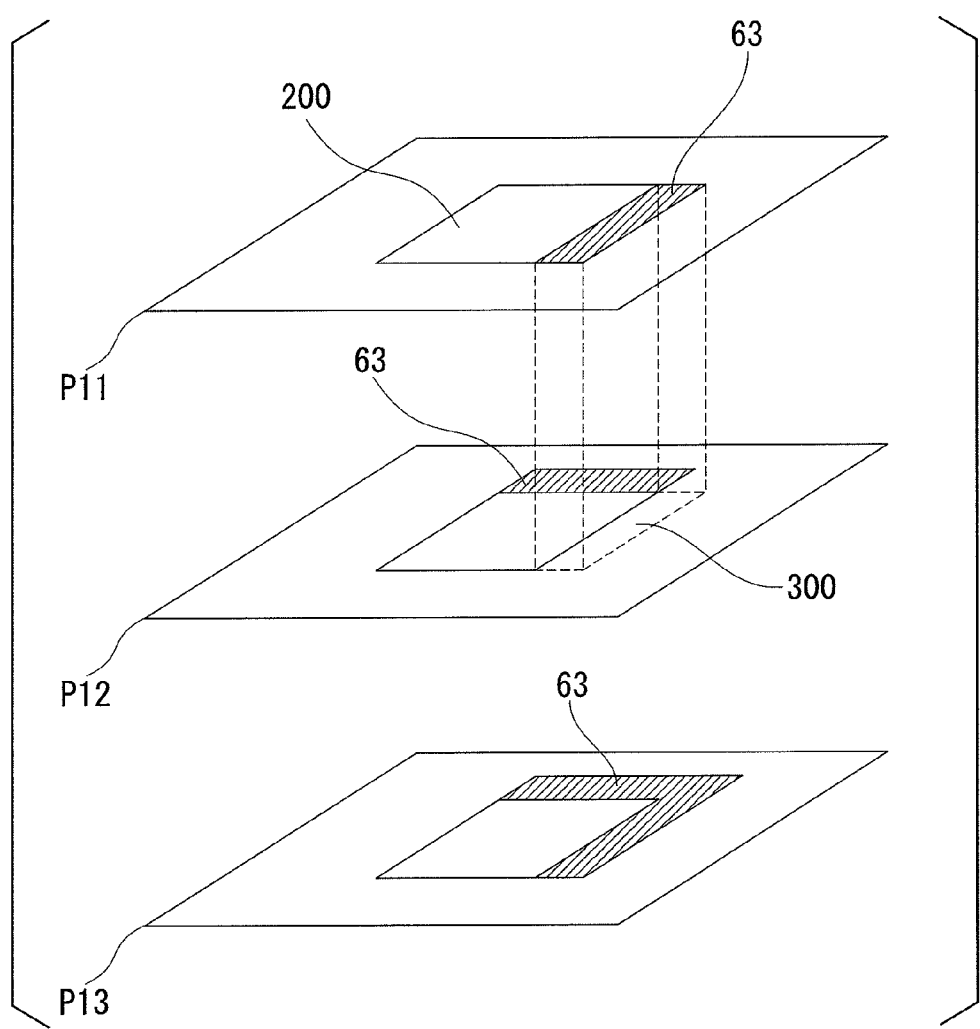
FIG. 18 is a schematic representation showing the corresponding point searching method of the multocular imaging apparatus according to the second embodiment.
Figure 19:
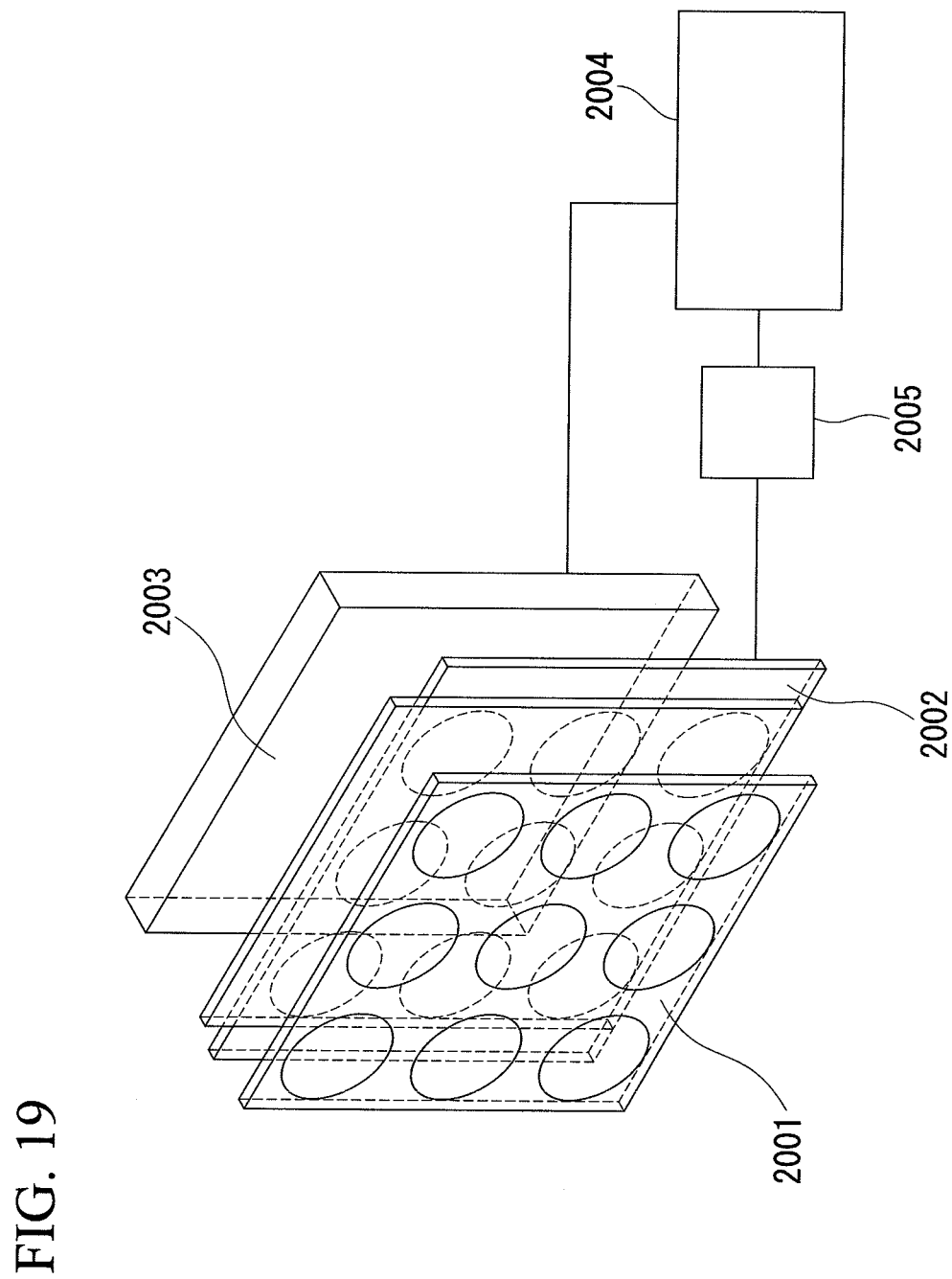
FIG. 19 is a block diagram showing the constitution of a conventional multocular imaging apparatus.
Figure 20A:
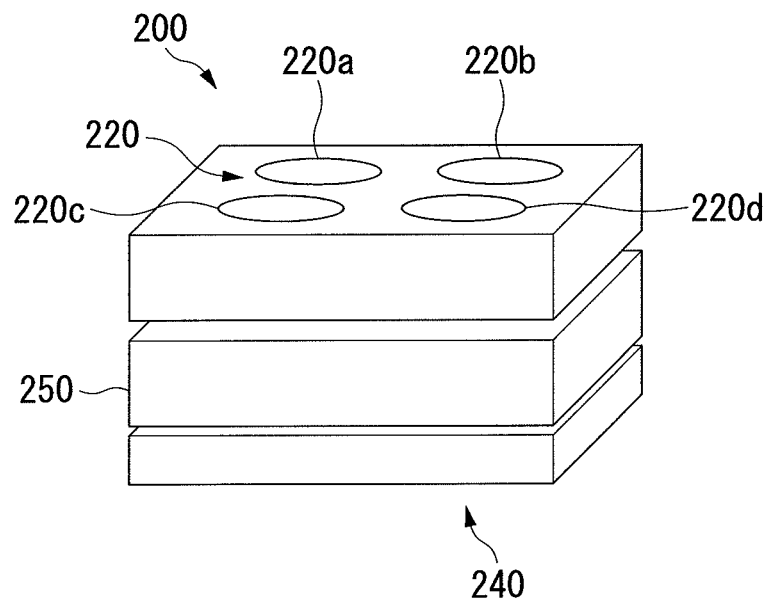
FIG. 20A is a block diagram showing the constitution of another conventional multocular imaging apparatus.
Figure 20B:
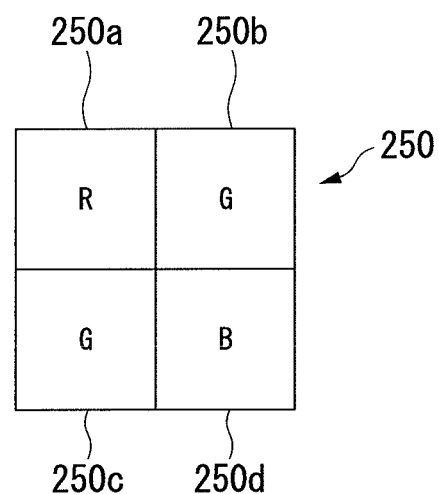
FIG. 20B is a simplified drawing of the constitution of the color filter of the multocular imaging apparatus of FIG. 20A.

The method of eliminating the occlusion region will now be described, referring to the positional relationship of each of the occlusion regions, as shown in FIG. 18. FIG. 18 shows in hierarchal form the parallax data D12, D13, and D14 between each of the reference images P11, P12, and P13 shown in FIG. 17. This s shows that the occlusion region 63 occurring on the right side of the captured object 200 in the first reference image P12 is eliminated by calculating the parallax data D13 from the "region 300 for calculating a new parallax data" in the second reference image P12, with the parallax data D11 overall taken with respect to the template image P21. Also, in the third reference image P13 of FIG. 18, because the entire occlusion region 63 occurring in the first reference image P11 is interpolated by the second reference image P12, this shows that, having determined the parallax data D11 with respect to the template image P21, the third reference image P13 is not used. In this manner, in the case in which all the occlusion regions are eliminated by the corresponding point searching unit 86 or 87 shown in FIG. 16 in corresponding point up to this point, further corresponding point searching processing with regard to subsequent reference images may be stopped.

Up until the foregoing, the second embodiment, with regard to region in which a parallax calculation error or occlusion region is detected with respect the parallax data D12 determined between the template image P21 and the first reference image P11, determination was done from a reference image other than these regions. Additionally, in the case in which a parallax calculation error or occlusion is detected, the parallax data D11 is hierarchally calculated by the method of calculation from a new reference image that is not used. Because it is possible to detect the parallax data from another camera for an undetected area of parallax data, compared with the case of separately searching the overall image between the template image P21 and each of the reference images P11 to P13 and then finally synthesizing, a dramatic reduction is possible in the amount of processing. Thus, even in the case in which the number of cameras is increases, or the case in which the number of pixels of each camera is improved, it is possible to reduce the size of the circuitry, and to perform real-time processing.

Although the above description was for a quadrocular camera constitution, there is no restriction to a quadrocular constitution, and application is possible to constitutions with other numbers of cameras. In the case of a constitution other than a quadrocular constitution, in the distance calculating unit 151 shown in FIG. 16 it is sufficient to have a number of coordinate transforming units 81 to 84 that is the number of cameras, and to have a number of corresponding point searching units 85 to 87 that is one less than the number of cameras. Additionally, because detection-not-possible regions for the parallax data can be detected by other cameras even if the number of cameras is increased, it is always possible to configure the constitution with the minimum amount of processing (number of steps, memory, circuitry scale, and the like).

As described above, distance information (parallax data) is calculated from searching for corresponding points with regard to two video pairs from three or more cameras, and selection is made of either synthesizing processing of high-definition video from a plurality of camera video based on that distance information, or generating synthesized video from the camera video from one camera that is the reference. For this reason, compared with the conventional art of performing corresponding point searching between all the camera videos, it is possible to achieve a dramatic reduction in the amount of processing, and to suppress the deterioration of image quality in a region (occlusion regions or the like) in which distance information could not be calculated.

Because distance information is calculated for regions in which the distance information could not be calculated by using the video of a different camera, it is possible to reduce the regions in which the distance information cannot be calculated. Additionally, because the regions in which synthesis is possible of high-definition video from a plurality of camera video are increased, it is possible to generate video with better definition.

Also, because distance information is calculated for regions in which the distance information could not be calculated by using video of a different camera, compared with conventional art in which searching is done for corresponding points between all camera videos, it is possible to greatly reduce the amount of processing. Also, by reducing the luminance of regions such as occlusion regions in which it was not possible to calculate the distance information, thereby preventing achievement of high definition, by a prescribed ratio, synthesis is possible without having those regions stand out. Along with that, it is possible to effectively present an appearance that matches the human visual psychological effect of the brightness perception of darkness with the depth of the occlusion.

Also, the video luminance in a region such as an occlusion region in which distance information could not be calculated and high definition could not be achieved may be generated as darker than the luminance of a region that is adjacent to and in front thereof. By doing this, it is possible to effectively present an appearance that matches the human visual psychological brightness perception effect due to depth, the region overlapped by occlusion appearing darker than a more foreground region.

Also, the video luminance in a region, such as an occlusion region in which distance information could not be calculated and high definition could not be achieved, may be generated by adjusting the luminance to coincide with the luminance of a region that is adjacent to and further to the rear from that region. By doing this, continuity is maintained between the occlusion region and a rear region with which it is to be continuous, thereby enabling synthesis of an appearance that does not present an unnatural visual psychological effect. Additionally, a region such as an occlusion region in which distance information could not be calculated d can be synthesized by reducing the color saturation thereof by a prescribed ratio, so that the region does not stand out. Along with this, it is possible to effectively present an appearance that matches the human visual psychological effect of the occlusion region colors becoming dull with depth.

Also, the color saturation in a region such as an occlusion region in which the distance information could not be calculated may be generated by reducing the saturation to lower than that of an adjacent region that is further in the foreground. By doing this, it is possible to effectively present an appearance that matches the human visual psychological color saturation perception effect of the occlusion region colors becoming duller than a region further in the foreground.

Also, a region such as an occlusion region, in which the distance information could not be calculated, may be generated by adjusting the color saturation to coincide with that of an adjacent region that is further in the background. By doing this, continuity is maintained between the occlusion region and a background region to which it is to be made continuous, thereby enabling synthesis of an appearance that does not present an unnatural visual psychological effect.

Additionally, a region such as an occlusion region in which the distance information could not be calculated may be blurred. By doing this, in addition to being able to synthesize without that region standing out, it is possible to effectively achieve an appearance of the human visual psychological effect by the depth of the blurred appearance because of the occlusion.

As is clear from the foregoing description, by the constitution of the embodiments of the present invention, compared with the convention art of searching for corresponding points between all the camera videos, there is a dramatic reduction in the amount of processing, and it is possible to suppress the deterioration of image quality of regions in which the parallax data cannot be detected (parallax data calculation error regions or occlusion regions). Additionally, by presenting a region in which high definition was not possible because of not being able to detect parallax data in a manner that approaches the human visual psychological perception when viewed with both left and right eyes, it is possible to provide a multocular imaging apparatus and a multocular imaging method capable of improving the overall appearance of the synthesized high-definition image.

A program for the purpose of implementing the functions of the video processing unit 20 and the distance calculating unit 21 shown in FIG. 2, and the distance calculating unit 151 shown in FIG. 15 may be recorded on a computer-readable recording medium, and a computer system may read and execute the program recorded on the recording medium, thereby performing synthesis of the high-definition image. The term "computer system" includes an operating system and also hardware, such as peripheral devices. The term "computer-readable recording medium" refers to a portable medium, such as a flexible disk, an optical-magnetic disc, a ROM, and a CD-ROM, and a storage device, such as a hard disk that is built into a computer system. The term "computer-readable recording medium" further includes something that retains a program for a certain time, such as a flash memory (RAM) internally provided in a computer system acting as the server and client in the case in which the program is transmitted via a network such as the Internet, and a communication line such as a telephone line.

The above-program may be transferred from the computer system holding this program in a memory device and the like to the other computer system via a transmission medium or by a transmission wave in a transmission medium. The term "transmission medium" that transmits a program refers to a medium that has the function transferring information, for example, a network (communication network) of the Internet or the like and communication line (communication wire) such as a telephone line. The program may have the object of implementing a part of the above-described functions, and it may also implement the above-described function in combination with a program already stored in a computer system, that is, it may be a differential file (differential program).

INDUSTRIAL APPLICABILITY

The present invention is applicable to an image pickup apparatus that obtains a high-definition image by synthesizing a plurality of images obtained by using a plurality of image pickup systems.

REFERENCE SYMBOLS

10: Multocular image pickup apparatus
101 to 104: Image pickup unit
11: Imaging lens
12: Imaging element
20: Video processing unit
21, 151: Distance calculating unit
30, 80: Camera parameter storage unit
31, 32, 81 to 84: Coordinate transforming unit
33, 85 to 87: Corresponding point searching unit
401: Positioning compensation processing unit
403: Monocular video synthesizing unit
404: Multocular video synthesizing unit
40b: Pixel of image pickup unit 101
40c: Pixel of image pickup unit 102
40d: Offset between image pickup unit 101 and image pickup unit 102
61: Foreground region
62: Background region
63: Occlusion region
64: Parallax data
65: High-definition image
66: Region showing luminance change of a high-definition image 65
88: Parallax data combining processing

The invention claimed is:

1. A multocular image pickup apparatus comprising:
a plurality of image pickup units configured to pick up images;
a distance calculation unit configured to calculate information regarding the distance to a captured object, the calculation of the information being performed based on an output image of a first image pickup unit, and an output image of at least one image pickup unit among the plurality of image pickup units, the first image pickup unit being the reference unit of the image pickup units, the at least one image pickup unit being different from the first image pickup unit;
a multocular image synthesizing unit configured to generate synthesized image from the output image of the plurality of image pickup units, the generation of the synthesized image being performed based on the distance information for regions where the distance information could be calculated in the distance calculation unit; and
a monocular image synthesizing unit configured to generate synthesized image from the output image of the first image pickup unit for regions where the distance information could not be calculated in the distance calculation unit, wherein
the distance calculation unit is configured to calculate a first distance information regarding the distance to the captured object, the calculation of the first distance information being performed based on the output image of the first image pickup unit and the output image of a second image pickup unit, the second image pickup unit being different from the first image pickup unit, and
in case that there is a region where the first distance information could not be calculated, for the region where the first distance information could not be calculated, the distance calculation unit is configured to recalculate, at least one time, information regarding the distance to the captured object, the recalculation of the information being performed based on the output image of an image pickup unit that was not used for calculating the distance among the plurality of image pickup units, and the output image of the first image pickup unit.

2. The multocular image pickup apparatus according to claim 1, wherein the monocular image synthesizing unit is configured to reduce, by a prescribed ratio, the luminance of the regions where the distance information could not be calculated in the distance calculation unit so as to generate the synthesized image.

3. The multocular image pickup apparatus according to claim 1, wherein
the monocular image synthesizing unit is configured to lower a luminance value of the regions, where the distance information could not be calculated in the distance calculation unit, to lower than that of foreground regions adjacent thereto, so as to generate the synthesized image.

4. The multocular image pickup apparatus according to claim 1, wherein
the monocular image synthesizing unit is configured to cause the luminance value of the regions where the distance information could not be calculated in the distance calculation unit are made to coincide with that of a background region adjacent thereto, so as to generate the synthesized image.

5. The multocular image pickup apparatus according to claim 1, wherein
the monocular image synthesizing unit is configured to reduce, by the prescribed ratio, the color saturation of the regions where the distance information could not be calculated in the distance calculation unit, so as to generate the synthesized image.

6. The multocular image pickup apparatus according to claim 1, wherein
the monocular image synthesizing unit is configured to lower color saturation of the regions where the distance information could not be calculated in the distance calculation unit to lower than that of foreground regions adjacent thereto, so as to generate the synthesized image.

7. The multocular image pickup apparatus according to claim 1, wherein
the monocular image synthesizing unit is configured to cause the color saturation of the regions where the distance information could not be calculated in the distance calculation unit to conform with that of the background region adjacent thereto, so as to generate the synthesized image.

8. The multocular image pickup apparatus according to claim 1, wherein
the monocular image synthesizing unit is configured to suppress a change of luminance of the regions where the distance information could not be calculated in the distance calculation unit so as to generate the synthesized image.

9. A multocular image pickup method comprising:
calculating information regarding the distance to a captured object, the calculation of the information being performed based on an output image of a first image pickup unit and an output image of at least one image pickup unit among a plurality of image pickup units, the first image pickup unit being the reference unit of the plurality of image pickup units, the plurality of image pickup units picking up images, the at least one image pickup unit being different from the first image pickup unit;

generating a synthesized image from the output image of the plurality of image pickup units, the generation of the synthesized image being performed based on the distance information for regions where the distance information could be calculated; and generating a synthesized image from the output image of the first image pickup unit for regions where the distance information could not be calculated, wherein in case of calculating the distance information, a first distance-information regarding the distance to the captured object is calculated, the calculation of the first-distance information being performed based on the output image of the first image pickup unit and the output image of a second image pickup unit, the second image pickup unit being different from the first image pickup unit, and in case that there is a region where the first distance information could not be calculated, for the region where the first distance information could not be calculated, at least one time, information regarding the distance to the captured object is recalculated, the recalculation of the information being performed based on the output image of an image pickup unit that was not used for calculating the distance among the plurality of image pickup units, and the output image of the first image pickup unit.

* * * * *